(12) United States Patent
Kang et al.

(10) Patent No.: US 10,970,605 B2
(45) Date of Patent: Apr. 6, 2021

(54) ELECTRONIC APPARATUS AND METHOD OF OPERATING THE SAME

(71) Applicant: SAMSUNG ELECTRONICS CO., LTD., Suwon-si (KR)

(72) Inventors: Seong-min Kang, Seoul (KR); Heung-woo Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/859,971

(22) Filed: Jan. 2, 2018

(65) Prior Publication Data
US 2018/0189615 A1 Jul. 5, 2018

(30) Foreign Application Priority Data

Jan. 3, 2017 (KR) .................. 10-2017-0000789
Oct. 20, 2017 (KR) .................. 10-2017-0136612

(51) Int. Cl.
*G06K 9/66* (2006.01)
*G06K 9/48* (2006.01)
(Continued)

(52) U.S. Cl.
CPC .............. *G06K 9/66* (2013.01); *G06F 16/51* (2019.01); *G06K 9/00684* (2013.01);
(Continued)

(58) Field of Classification Search
None
See application file for complete search history.

(56) References Cited

U.S. PATENT DOCUMENTS

2007/0104362 A1 5/2007 Hwang et al.
2011/0169982 A1* 7/2011 Yamakawa ............. G06F 16/58
348/231.2
(Continued)

FOREIGN PATENT DOCUMENTS

WO WO 2016/077834 A1 5/2016

OTHER PUBLICATIONS

Search Report and Written Opinion dated Apr. 18, 2018 in counterpart International Patent Application No. PCT/KR2018/000069.
(Continued)

*Primary Examiner* — David Perlman
(74) *Attorney, Agent, or Firm* — Nixon & Vanderhye P.C.

(57) ABSTRACT

An electronic apparatus includes a processor configured to obtain a plurality of images, extract deep features with respect to the plurality of images using a feature extraction model, classify the plurality of images into certain groups using the extracted deep features and a classification model, display a result of the classification on the display, determine whether the feature extraction model and/or the classification model need to be updated using the result of the classification, and train and update at least one of the feature extraction model and the classification model based on a result of the determination. The electronic apparatus may estimate a deep feature of an image using a rule-based or artificial intelligence (AI) algorithm. When the deep feature of the image is estimated using the AI algorithm, the electronic apparatus may use a machine learning, neural network, or deep learning algorithm, or the like.

20 Claims, 20 Drawing Sheets

(51) Int. Cl.
*G06K 9/62* (2006.01)
*G06K 9/00* (2006.01)
*G06F 16/51* (2019.01)
*G06N 3/04* (2006.01)
*G06N 3/08* (2006.01)
*G06K 9/46* (2006.01)
*G06N 3/02* (2006.01)

(52) U.S. Cl.
CPC ....... *G06K 9/00973* (2013.01); *G06K 9/4628* (2013.01); *G06K 9/481* (2013.01); *G06K 9/6202* (2013.01); *G06K 9/6215* (2013.01); *G06K 9/6218* (2013.01); *G06K 9/6262* (2013.01); *G06K 9/6267* (2013.01); *G06K 9/6274* (2013.01); *G06N 3/0454* (2013.01); *G06N 3/08* (2013.01); *G06N 3/02* (2013.01); *G06N 3/0445* (2013.01)

(56) References Cited

U.S. PATENT DOCUMENTS

| | | |
|---|---|---|
| 2013/0051650 A1 | 2/2013 | Santamaria-Pang et al. |
| 2013/0129142 A1 | 5/2013 | Miranda-Steiner |
| 2014/0098050 A1 | 4/2014 | Endo |
| 2015/0142708 A1 | 5/2015 | Jing et al. |
| 2015/0254532 A1 | 9/2015 | Talathi et al. |
| 2016/0117574 A1 | 4/2016 | Mei et al. |
| 2016/0140146 A1 | 5/2016 | Wexler et al. |
| 2017/0032189 A1* | 2/2017 | Zhang ................ G06K 9/00684 |
| 2017/0091619 A1* | 3/2017 | Towal .................... G06N 3/084 |
| 2018/0129900 A1* | 5/2018 | Kiraly .................. G06F 19/321 |
| 2018/0182081 A1* | 6/2018 | Chesnokov ............... G06T 5/50 |
| 2018/0300576 A1* | 10/2018 | Dalyac ................. G06K 9/6263 |

OTHER PUBLICATIONS

Partial European Search Report dated Nov. 20, 2019 for EP Application No. 18735947.6.
Hoo-Chang et al., Deep Convolutional Neural Networks for Computer-Aided Detection: CNN Architectures, Dataset Characteristics and Transfer Learning:, IEEE Trans Med Imaging, May 2016, pp. 1285-1298.
Anonymous: "Convolutional Neural Network", Dec. 30, 2016.
Long et al., "Learning Transferable Features with Deep Adaptation Networks", 32$^{nd}$ International Conference on Machine Learning, Feb. 10, 2015.
European Search Report dated Apr. 3, 2020 for EP Application No. 18735947.6.
Chapter 5: "Neural Networks" in: Christopher Bishop: "Pattern Recognition and Machine Learning", Springer, 2006, XP055679843.

* cited by examiner

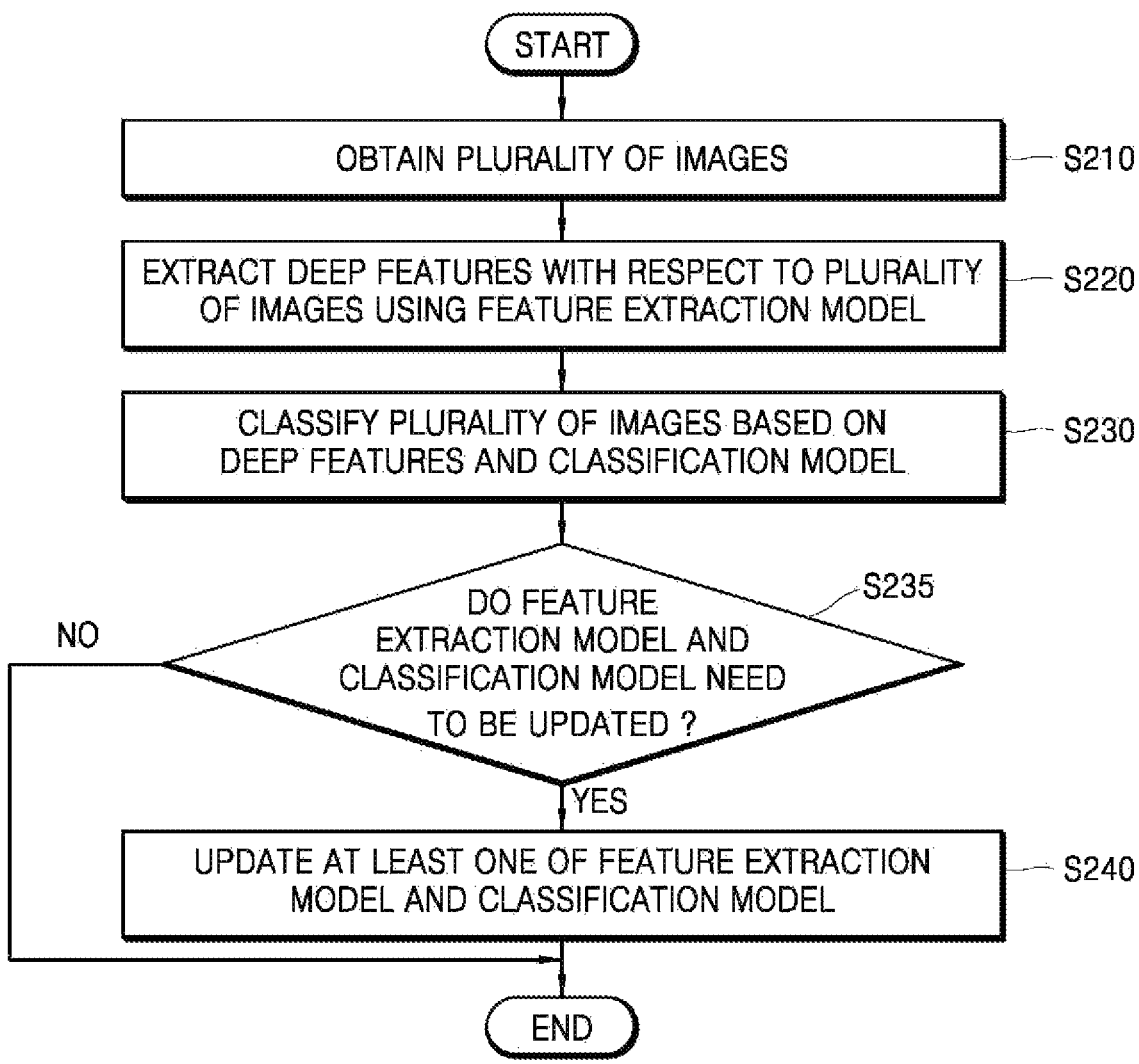

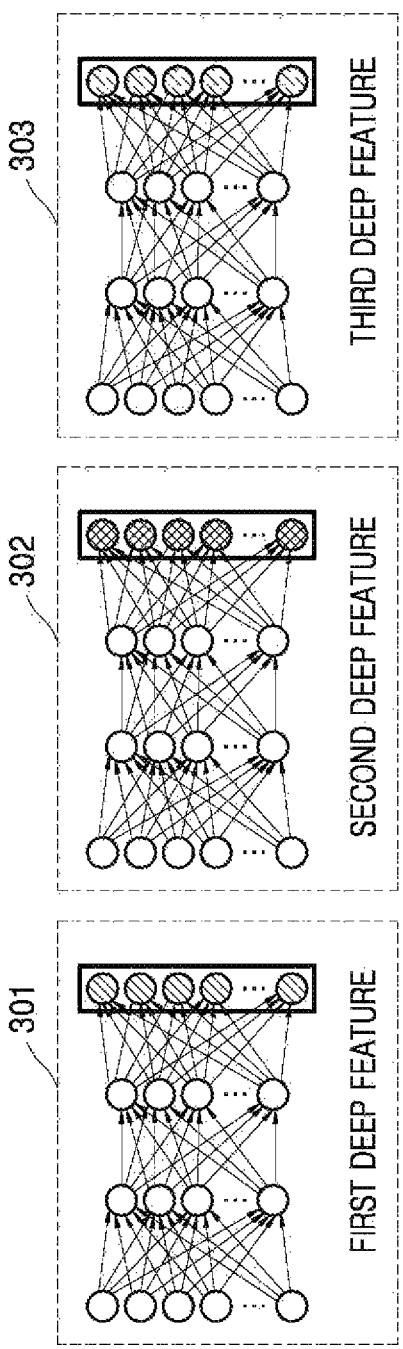
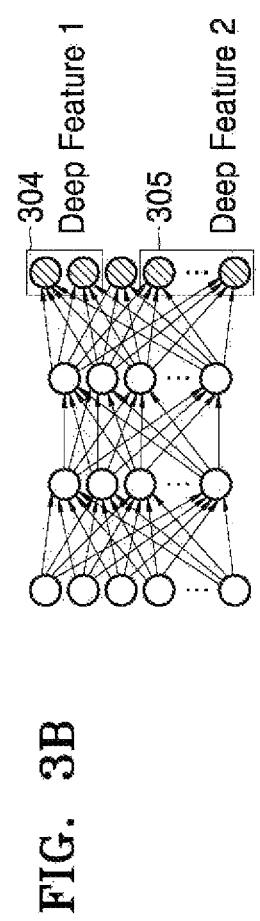
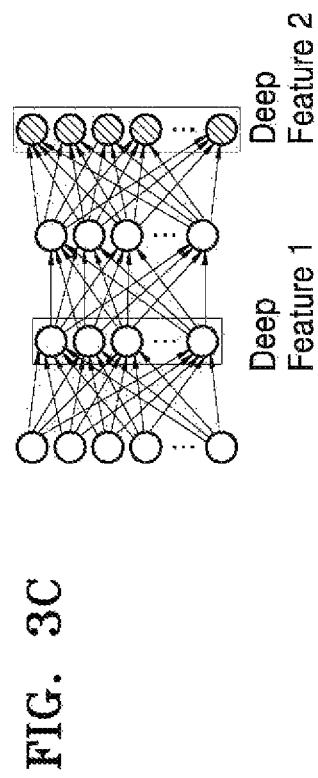
FIG. 3A
FIG. 3B
FIG. 3C

FIG. 6A
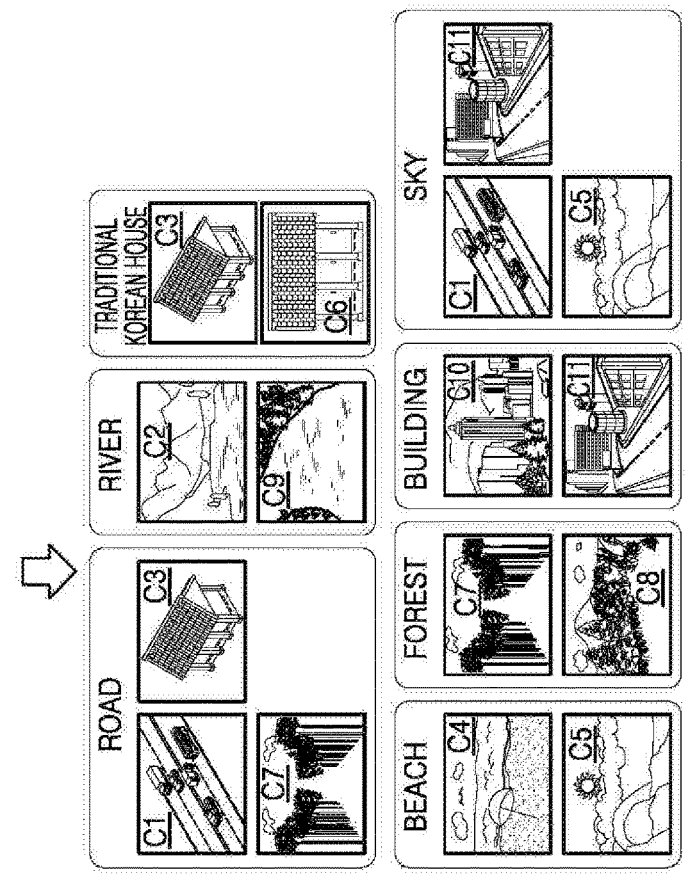
FIG. 6B
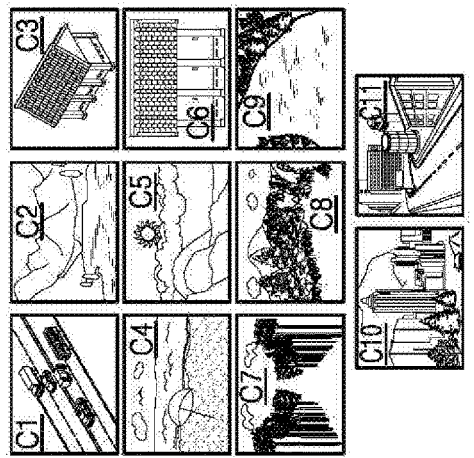
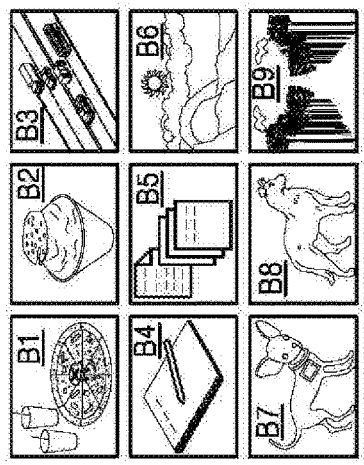
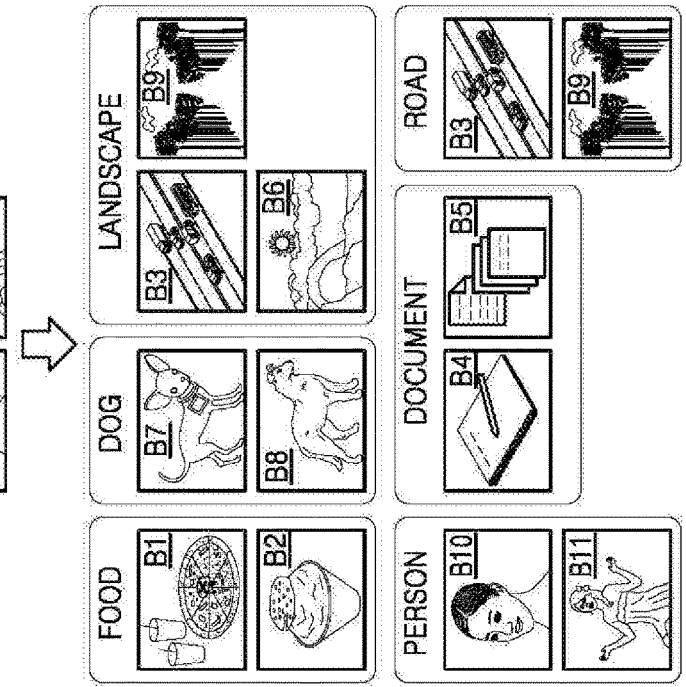

ELECTRONIC APPARATUS AND METHOD OF OPERATING THE SAME

CROSS-REFERENCE TO RELATED APPLICATIONS

This application is based on and claims priority under 35 U.S.C. § 119 to Korean Patent Application No. 10-2017-0000789, filed on Jan. 3, 2017, and Korean Patent Application No. 10-2017-0136612, filed on Oct. 20, 2017, in the Korean Intellectual Property Office, the disclosures of which are incorporated by reference herein in their entireties.

BACKGROUND

1. Field

The present disclosure relates generally to electronic apparatuses and methods of operating the same, and for example, to an electronic apparatus capable of classifying a plurality of images into a certain group or assigning a particular keyword to a certain group, and a method of operating the electronic apparatus.

Also, the present disclosure relates to an artificial intelligence (AI) system and application thereof, which provide recognition and decision-making, using a machine learning algorithm, such as deep learning.

2. Description of Related Art

With the development of information and communication technologies and semiconductor technologies, various electronic apparatuses have been developed into multimedia apparatuses providing various multimedia services. For example, an electronic apparatus provides various multimedia services, such as a messenger service, a broadcasting service, a wireless Internet service, a camera service, and a music reproducing service.

Also, the electronic apparatus provides a function of classifying and searching for an image. The electronic apparatus may classify images of a user into a certain group by using a pre-set classification criterion, but it is not possible to provide a classification result optimized for the user since a set classification criterion is used.

Also, the electronic apparatus may store the images of the user together with a keyword, and provides an image search function that uses the keyword. However, during an image search using a keyword, only images stored in accordance with the keyword assigned by the user may be found, and thus the user has to precisely remember keywords corresponding to images desired to be found.

Also, recently, an artificial intelligence (AI) system is introduced to image processing fields.

The AI system is a system in which a machine self-learns, determines, and becomes intelligent, unlike an existing rule-based smart system. The more the AI system is used, a recognition rate is increased and a user's taste is more accurately understood, and thus the existing rule-based smart system is gradually replaced by a deep-learning-based AI system.

AI technology includes machine learning (deep learning) and element technologies using the machine learning.

The machine learning is an algorithm technology that self-classifies and learns features of input data. Element technologies are technologies for simulating functions, such as recognition and determination, using a machine learning algorithm, such as deep-learning, and includes the technical fields of linguistic understanding, visual understanding, inference/prediction, knowledge representation, or operation control.

The various fields to which the AI technology may be applied are as follows. Linguistic understanding is a technique of recognizing languages/characters of people and applying/processing the languages/characters, and includes natural language processing, machine translation, a dialog system, questions and answers, or voice recognition/synthesis. Visual understanding is a technique of recognizing an object, and includes object recognition, object tracing, image search, person recognition, scene understanding, space understanding, or image improvement. Inference/prediction is a technique of logically inferring and predicting information by determining the information, and includes knowledge/probability-based inference, optimization prediction, preference-based plans, or recommendation. Knowledge representation is a technique of automating experience information into knowledge data, and includes knowledge construction (data generation/classification) or knowledge management (data application). Operation control is a technique of controlling automatic driving of a vehicle or movement of a robot, and includes movement control (navigation, collision avoidance, driving) or manipulation control (action control).

SUMMARY

Provided are electronic apparatuses capable of extracting a feature of an image, classifying the image based on the extracted feature, and searching for similar images based on the extracted feature, and methods of operating the electronic apparatuses.

Provided are electronic apparatuses capable of assigning a keyword appropriate to a feature of an image, without being set by a user, and methods of operating the electronic apparatuses.

Additional example aspects will be set forth in part in the description which follows and, in part, will be apparent from the description.

According to an example aspect of an example embodiment, an electronic apparatus includes: a display; a memory configured to store at least one instruction; and a processor configured to execute the at least one instruction stored in the memory, to cause the electronic device to: obtain a plurality of images, extract deep features with respect to the plurality of images using a feature extraction model, classify the plurality of images into certain groups using the extracted deep features and a classification model, display a result of the classification on the display, determine whether the feature extraction model and the classification model need to be updated using the result of the classification, and train and update at least one of the feature extraction model and the classification model based on a result of the determination.

According to an example aspect of another example embodiment, a method of operating an electronic apparatus, includes: obtaining a plurality of images; extracting deep features with respect to the plurality of images using a feature extraction model; classifying the plurality of images into certain groups using the extracted deep features and a classification model and displaying a result of the classification; determining whether the feature extraction model and the classification model need to be updated using the result of the classification; and training and updating at least one of the feature extraction model and the classification model based on a result of the determination.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIG. 2 is a flowchart illustrating an example method of operating an electronic apparatus, according to an example embodiment of the present disclosure;

FIGS. 3A, 3B and 3C are diagrams illustrating an example method of extracting a deep feature of an image, according to an example embodiment of the present disclosure;

FIGS. 6A and 6B are diagrams illustrating an example method of classifying a plurality of images using a feature extraction model and a classification model, which are trained based on user data, according to an example embodiment of the present disclosure;

DETAILED DESCRIPTION

Figure 1:
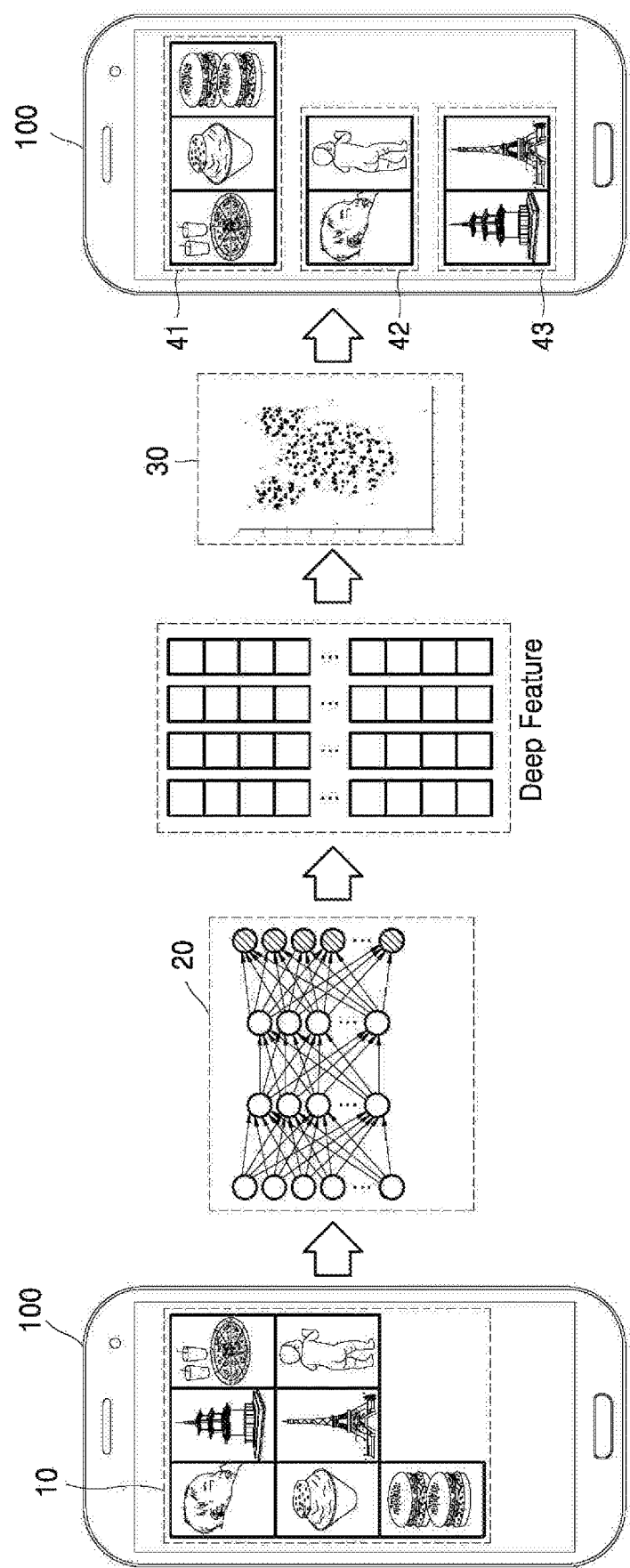
FIG. 1 is a diagram illustrating an example method of classifying images, the method performed by an electronic apparatus, according to an example embodiment of the present disclosure.

All terms including descriptive or technical terms which are used herein should be understood as having meanings that are apparent to one of ordinary skill in the art.

However, the terms may have different meanings according to an intention of one of ordinary skill in the art, precedent cases, or the appearance of new technologies. Also, some terms may be arbitrarily selected, and in this case, the meaning of the selected terms will be described in the present disclosure. Thus, the terms used herein have to be defined based on the meaning of the terms together with the description throughout the disclosure.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware (e.g., circuitry), firmware or software or may be embodied by any combination thereof.

Various example embodiments of the present disclosure will now be described more fully with reference to the accompanying drawings. However, the example embodiments of the present disclosure may be embodied in many different forms, and should not be understood as being limited to the embodiments set forth herein; rather, these embodiments are provided so that this disclosure will be thorough and complete, and will fully convey the concept of the example embodiments of the present disclosure to those of ordinary skill in the art. In the following description, well-known functions or constructions may not described in detail since if they would obscure the example embodiments of the present disclosure with unnecessary detail, and like reference numerals in the drawings denote like or similar elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example method of classifying images, the method performed by an electronic apparatus 100, according to an example embodiment of the present disclosure.

The electronic apparatus 100 according to an embodiment may be embodied in any one of various forms. For example, and without limitation, the electronic apparatus 100 may be embodied in any one of various electronic apparatuses, such as a mobile phone, a smart phone, a laptop computer, a desktop computer, a tablet personal computer (PC), an electronic book terminal, a digital broadcasting terminal, a personal digital assistant (PDA), a portable multimedia player (PMP), a navigation device, an MP3 player, a digital camera, a camcorder, an Internet protocol television (IPTV), a digital television (DTV), and a wearable device (for example, a smart watch or smart glasses), or the like, but is not limited thereto.

In embodiments of the present disclosure, the term "user" may refer, for example, to a person who controls functions or operations of an electronic apparatus, and may be a viewer, a manager, or an installation engineer.

The electronic apparatus 100 according to an embodiment may obtain a plurality of images 10. The plurality of images 10 may include an image captured using the electronic apparatus 100, an image stored in the electronic apparatus 10, or an image received from an external apparatus.

The electronic apparatus 100 according to an embodiment may extract deep features of the plurality of images 10 using a feature extraction model 20.

The feature extraction model 20 may, for example, and without limitation, be a neural network-based model. For example, a model, such as a deep neural network (DNN), a recurrent neural network (RNN), or a bidirectional recurrent deep neural network (BRDNN), may be used as the feature extraction model 20, or the like, but is not limited thereto.

Also, the feature extraction model 20 may initially be a model trained based on general-purpose data. A deep feature of an image may include a vector extracted from at least one layer included in at least one neural network by inputting the image into the at least one neural network.

A vector may include, for example, a feature of an image. A feature of an image may include, for example, a shape or type of an object included in the image, or a place where the image is captured.

Accordingly, the feature extraction model 20 may be trained using an image and a feature (for example, a shape of an object, a type of an object, a scene recognition result, or a captured place) of the image as learning data. For example, the feature extraction model 20 may be trained by using, as the learning data, an image of a puppy, a type of the puppy, and a captured place. Also, the feature extraction model 20 may be trained by using, as the learning data, an image of a night view, a name of a building included in the night view, and a captured place. Accordingly, when an image is input, the electronic apparatus 100 may extract deep features including such features of the image by using the feature extraction model 20.

When deep features of the plurality of images 10 are extracted, the electronic apparatus 100 according to an embodiment may classify the plurality of images 10 using the extracted deep features and a classification model 30.

The classification model 30 may, for example, and without limitation, be a neural network-based model. For example, a model, such as DNN, RNN, or BRDNN, or the like, may be used as the classification model 30, but is not limited thereto.

Also, the classification model 30 may initially be a model trained based on general-purpose data. For example, the classification model 30 may be trained using an image, a deep feature extracted from the image, and an image classification result as learning data. For example, the classification model 30 may be trained by using, as the learning data, an image of a puppy, a deep feature (for example, a shape or type of the puppy) of the image, and a classification list (for example, a puppy, a beagle, or a poodle) of the image. Also, the classification model 30 may be trained by using, as the learning data, an image of a night view, a deep feature (for example, a location where the night view was imaged or a name of a building) extracted from the image, and a classification (for example, a landscape or a night view) of the image.

Accordingly, the classification model 30 may classify the plurality of images 10 into a certain group based on similarity between the deep features with respect to the plurality of images 10. Here, the similarity between the deep features may, for example, be indicated by a distance between vectors extracted as the deep features. For example, when the vectors are displayed on a coordinate system, the similarity may be high when the distance between the vectors displayed on the coordinate system is short, and the similarity may be low when the distance between the vectors is long. However, an embodiment is not limited thereto.

The classification model 30 according to an embodiment may classify images corresponding to vectors within a pre-set distance range into one group. For example, from among the plurality of images 10, images (for example, images indicating features of 'food') displayed in a first region of a coordinate region may be classified into a first group 41, images (for example, images indicating features of a 'baby') displayed in a second region may be classified into a second group 42, and images (for example, images indicating features of a 'tower') displayed in a third region may be displayed into a third group 43.

Also, according to various embodiments, the classification model 30 may indicate a distance between vectors including shapes of puppies, such as a beagle and a poodle, to be short. Also, the classification model 30 may indicate a distance between vectors indicating a landscape, a night view, and a building to be short. Meanwhile, the classification model 30 may indicate the distance between the vectors including the shapes or puppies, and the distance between the vectors including the landscape and night view to be long. However, the various example embodiments are not limited thereto.

The feature extraction model 20 and the classification model 30 according to an example embodiment may be configured in one neural network or may be independently configured in different neural networks.

The feature extraction model 20 and the classification model 30 according to an example embodiment may determine whether an existing feature extraction model and an existing classification model need to be updated by using a result of classification. When it is determined that they need to be updated, the feature extraction model 20 and the classification model 30 may be re-trained by using user data.

For example, at least one of the feature extraction model 20 and the classification model 30 may be trained via supervised learning using the plurality of images 10 classified into the certain group as input values input to at least one of the feature extraction model 20 and the classification model 30. When the feature extraction model 20 and the classification model 30 are trained via supervised learning, the feature extraction model 20 and the classification model 30 may be trained using a plurality of images generated by a user and keyword mapping information (for example, features of the images input by the user) of the user corresponding to each of the plurality of images.

At least one of the feature extraction model 20 and the classification model 30 may be trained via unsupervised learning in which an image classifier is re-trained without any particular supervision and an image classification criterion is found in relation to a learning result of a language model. Also, at least one of the feature extraction model 20 and the classification model 30 may be trained by finding the image classification criterion without supervision, by associating the learning result of the language model and a result of learning via supervised learning.

Also, the feature extraction model 20 and the classification model 30 may be trained via reinforcement learning using feedback indicating whether a classification result of images according to learning is correct. However, an embodiment is not limited thereto.

FIG. 2 is a flowchart illustrating an example method of operating the electronic apparatus 100, according to an example embodiment of the present disclosure.

Referring to FIG. 2, the electronic apparatus 100 according to an embodiment may obtain a plurality of images, in operation S210.

The electronic apparatus 100 according to an embodiment may extract deep features with respect to the plurality of images using a feature extraction model, in operation S220.

A feature extraction model may be a neural network-based model. For example, a model, such as DNN, RNN, or BRDNN, or the like, may be used as the feature extraction model, but is not limited thereto. A deep feature of an image may include a vector extracted from at least one layer included in at least one neural network by inputting the image into the at least one neural network.

Also, the deep feature of the image may be stored in a metadata form, such as EXIF. Also, when a format of an image file is not JPEG, the image file may be converted into JPEG and the deep feature of the image may be stored in EXIF. However, an embodiment is not limited thereto.

Also, the electronic apparatus 100 may store the deep feature of the image as metadata of the image such that the deep feature is not extracted again whenever the image is classified, and classify the image by using the stored deep feature. Accordingly, an image classification speed may be increased.

Also, when the deep feature of the image is stored in EXIF, information about the deep feature may be maintained even when the image file is stored in another electronic apparatus. For example, the information about the deep feature of the image may be maintained in an external apparatus even when the image file is transmitted to the external apparatus instead of the electronic apparatus 100. Accordingly, another apparatus may classify or search for the image by using the information about the deep feature, and when a feature extraction model and a classification model are respectively stored in a first electronic apparatus and a second electronic apparatus, the second electronic apparatus may classify images by using deep features of images extracted by the first electronic apparatus.

The electronic apparatus 100 according to an embodiment may classify the plurality of images based on the deep features with respect to the plurality of images, and a classification model, in operation S230.

The classification model may be a neural network-based model. For example, a model, such as DNN, RNN, or BRDNN, or the like, may be used as the classification model, but is not limited thereto.

Also, the classification model may initially be a model trained based on general-purpose data. The classification model may classify the plurality of images into a certain group based on similarity between the deep features with respect to the plurality of images. Here, the similarity between the deep features may be indicated by a distance between vectors extracted as the deep features.

Also, the electronic apparatus 100 according to an embodiment may display a result of classifying the plurality of images.

The electronic apparatus 100 according to an embodiment may determine whether the feature extraction model and the classification model need to be updated using the result of classifying the plurality of images, in operation S235.

For example, the electronic apparatus 100 may determine whether the feature extraction model and/or the classification model need to be updated based on a balance of the numbers of images included in groups into which the plurality of images are classified. The electronic apparatus 100 may determine that the feature extraction model and/or the classification model need to be updated when, based on the result of classifying the plurality of images, images are included only in a particular group while no image is included in other groups or images numbering less than a pre-set number are included in the other groups. On the other hand, the electronic apparatus 100 may determine that the feature extraction model and/or the classification model do not need to be updated when, based on the result of classifying the plurality of images, images included in certain groups are equal to or more than the pre-set number. However, an example embodiment is not limited thereto, and necessity of updating the feature extraction model and the classification model may be determined based on various criteria.

When it is determined that the feature extraction model and/or the classification model need to be updated, the electronic apparatus 100 according to an embodiment may train and update at least one of the feature extraction model and the classification model in operation S240.

The electronic apparatus 100 according to an embodiment may re-train and update at least one of the feature extraction model and the classification model by using user data (for example, a plurality of user images). Since the user data is used to update the feature extraction model and the classifying mode, the feature extraction model and the classification model may be updated suitable for the user data.

The electronic apparatus 100 according to an embodiment may update at least one of the feature extraction model and the classification model periodically or when there is a user request. At least one of the feature extraction model and the classification model may be updated when the electronic apparatus 100 is in a pre-set state. For example, at least one of the feature extraction model and the classification model may be updated when the electronic apparatus 100 enters a standby mode or is in a charging state, or when the electronic apparatus 100 is connected to a Wi-Fi network. However, an embodiment is not limited thereto.

The electronic apparatus 100 according to an embodiment may extract the deep features of the obtained plurality of images, and classify the plurality of images by using the feature extraction model and the classification model, which are updated via learning. Also, the electronic apparatus 100 may re-extract the deep features of the plurality of images, which are pre-classified. Accordingly, the information about the deep features of the pre-classified plurality of images may be updated or added. Also, the electronic apparatus 100 may re-classify the plurality of images based on the re-extracted deep features.

FIGS. 3A, 3B and 3C are reference diagrams illustrating an example method of extracting a deep feature of an image, according to an example embodiment of the present disclosure.

A deep feature of an image according to an embodiment may, for example, and without limitation, include a vector extracted from at least one layer included in at least one neural network by inputting the image into the at least one neural network.

Referring to FIG. 3A, the electronic apparatus 100 according to an embodiment may extract a plurality of deep features with respect to an image by inputting the image input different types of neural network. For example, the image may be input to a first neural network 301 to extract a first deep feature from an n-th layer of the first neural network 301, the image may be input to a second neural network 302 to extract a second deep feature from an n-th layer of the second neural network 302, and the image may be input to a third neural network 303 to extract a third deep feature from an n-th layer of the third neural network 303.

Also, referring to FIG. 3B, the electronic apparatus 100 according to an embodiment may extract a plurality of deep features with respect to an image from different sub-networks included in one neural network by inputting the image into the one neural network. For example, the image may be input to a neural network including a first sub-network 304 and a second sub-network 305 to extract a first deep feature from an n-th layer of the first sub-network 304 and extract a second deep feature from an n-th layer of the second sub-network 305.

Also, referring to FIG. 3C, the electronic apparatus 100 according to an embodiment may extract a plurality of deep features with respect to an image from different layers by inputting the image into one neural network. For example, the image may be input to the one neural network to extract a first deep feature from an n-th layer of the one neural network and extract a second deep feature from an m-th layer of the one neural network.

The electronic apparatus 100 may store an extracted deep feature together with information about a neural network from which the deep feature is extracted, layer information of the neural network, and sub-network information. The electronic apparatus 100 according to an embodiment may classify a plurality of images or search for an image by using deep features extracted from one neural network.

Figure 4:
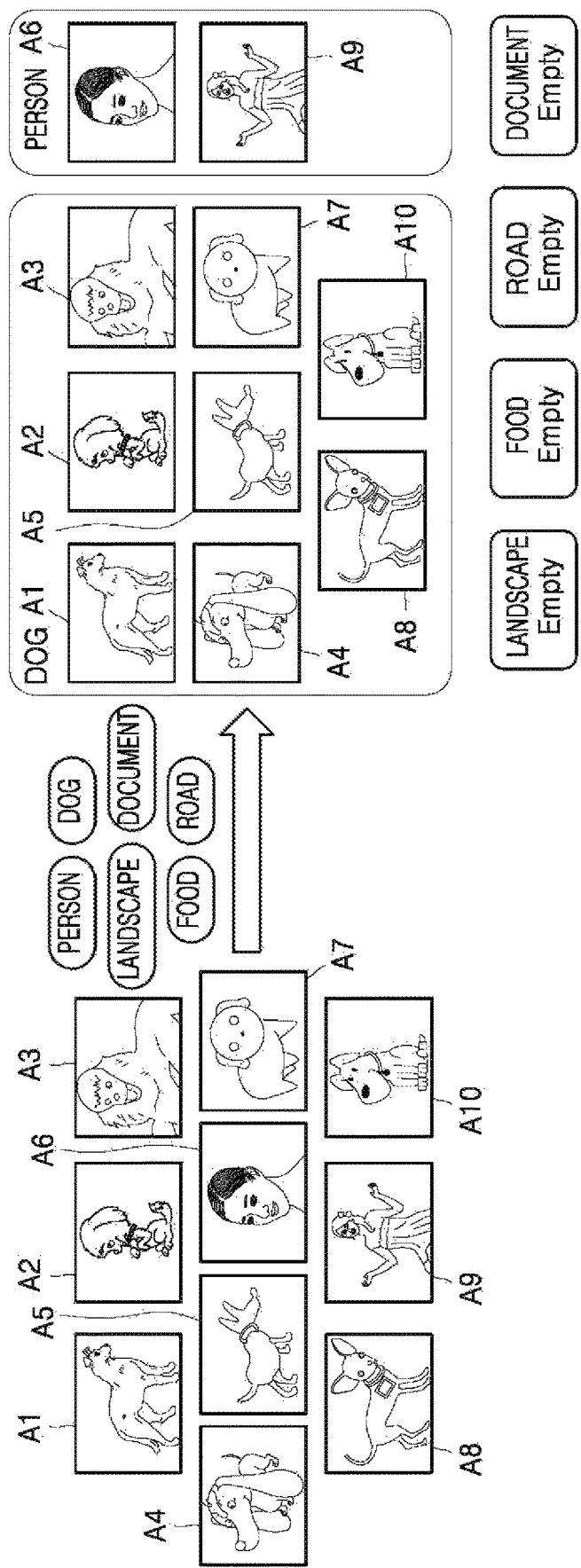
FIG. 4 is a diagram illustrating an example result of classifying, by an electronic apparatus, a plurality of images using a feature extraction model and a classification model, which are trained based on general-purpose data, according to an example embodiment of the present disclosure.

FIG. 4 is a diagram illustrating an example result of classifying, by the electronic apparatus 100, a plurality of images using a feature extraction model and a classification model, which are trained based on general-purpose data, according to an example embodiment of the present disclosure.

Referring to FIG. 4, the electronic apparatus 100 according to an embodiment may obtain a plurality of images. For example, as illustrated in FIG. 4, the electronic apparatus 100 obtain first through tenth images A1, A2, A3, A4, A5, A6, A7, A8, A9 and A10. The electronic apparatus 100 may classify the obtained first through tenth images A1 through A10 into certain groups using a feature extraction model and a classification model. Here, the feature extraction model and the classification model may be models that are pre-trained based on general-purpose data. For example, the feature extraction model and the classification model may be models trained to classify a plurality of images into six categories, e.g., 'person', 'dog', 'landscape', 'document', 'food', and 'road', but are not limited thereto. For example, types and number of categories may be determined by the feature extraction model and the classification model via learning, or may be set based on a user input.

When the electronic apparatus 100 classifies the first through tenth images A1 through A10 using the feature extraction model and the classification model, the first through fifth images A1 through A5, the seventh and eighth images A7 and A8, and the tenth image A10 may be classified into a 'dog' category, and the sixth and ninth images A6 and A9 may be classified into a 'person' category. When first through tenth images A1 through A10 are classified according to the feature extraction model and the classification model, which are trained based on general-purpose data, only the 'dog' and 'person' categories are used, and 'landscape', 'food', 'road', and 'document' categories are not used. Accordingly, when a user does not use images related to 'landscape', 'food', 'road', and 'document' and mainly uses only images related to 'dog' and 'person', performance perceived by the user with respect to the feature extraction model and the classification model, which are trained based on the general-purpose data, is reduced.

Figure 5:
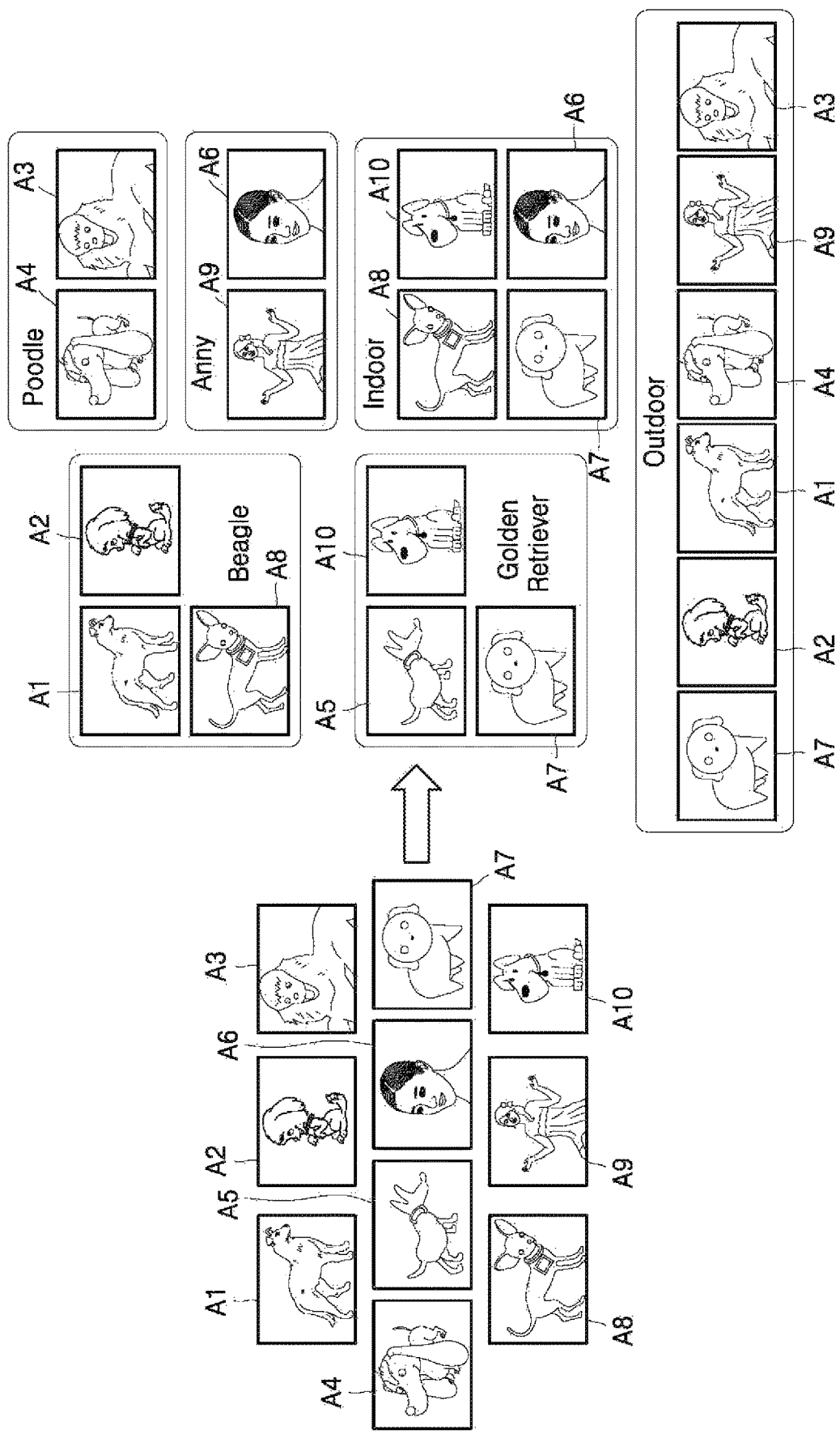
FIG. 5 is a diagram illustrating an example result of classifying, by an electronic apparatus, a plurality of images using a feature extraction model and a classifying mode, which are updated, according to an example embodiment of the present disclosure.

FIG. 5 is a diagram illustrating an example result of classifying, by the electronic apparatus 100, a plurality of images using a feature extraction model and a classifying mode, which are updated, according to an example embodiment of the present disclosure.

The electronic apparatus 100 according to an embodiment may train and update at least one of a feature extraction model and a classification model using user images. For example, the electronic apparatus 100 may determine necessity of updating the feature extraction model and the classification model using a result of classifying the first through tenth images A1 through A10 of FIG. 4. Also, the electronic apparatus 100 may train and update at least one of the feature extraction model and the classification model by using the user images.

Referring to FIG. 5, the electronic apparatus 100 may re-classify pre-classified images using the updated feature extraction model and the updated classification model. For example, when the plurality of images, e.g., first through tenth images A1 through A10, are classified using the updated feature extraction model and the updated classifying mode, the first, second, and eighth images A1, A2, and A8 may be classified into a first group, the third and fourth images A3 and A4 may be classified into a second group, the sixth and ninth images A6 and A9 may be classified into a third group, the fifth, seventh, and tenth images A5, A7, and A10 may be classified into a fourth group, the sixth to eighth and tenth images A6 to A8 and A10 may be classified into a fifth group, and the first through fourth images A1 through A4, seventh image A7, and ninth image A9 may be classified into a sixth group. Here, the first through tenth images A1 through A10 may be classified overlappingly into the first through sixth groups.

Comparing with the result of classifying of FIG. 4, the first through tenth images A1 through A10 are classified into two groups in FIG. 4, but are classified into six groups in FIG. 5. Compared to the feature extraction model and the classification model, which are trained based on general-purpose data, the feature extraction model and the classification model, which are trained based on user data, may more variously classify user images.

Also, the electronic apparatus 100 may generate group names of groups into which a plurality of images are classified automatically or based on a user input. The electronic apparatus 100 may automatically generate the group names of the groups by using a language model. The electronic apparatus 100 may detect a keyword corresponding to an image by comparing similarity between keywords in a language model and similarity between deep features of images.

For example, when a keyword (or a tag) "Beagle" is assigned to the first group, a group name of the first group may be set to "Beagle". Here, a second keyword having "Beagle" and similarity (distance between deep features) between a deep feature of an image included in the first group and a deep feature of an image included in the second group, by using a language model, may be determined. The determined second keyword may be assigned as a group name of the second group. The electronic apparatus 100 may determine group names corresponding to the first through third groups based on information that the first through third groups are groups corresponding to a 'dog' in FIG. 4. For example, the electronic apparatus 100 may determine a keyword corresponding to each of the deep feature of the image included in the first group, the deep feature of the image included in the second group, and the deep feature of the image included in the third group, by comparing similarity between lower keywords of "dog" in a language model and similarity between the deep features of the images included in the first through third groups. When the keywords are determined, the electronic apparatus 100 may assign the determined keywords as the group names of the respective groups. Accordingly, the first group may have a group name "Beagle", the second group may have a group name "Poodle", the third group may have a group name "Anny", the fourth group may have a group name "Golden Retriever", the fifth group may have a group name "Indoor", and the sixth group may have a group name "Outdoor". Also, the electronic apparatus 100 may generate a folder corresponding to each of the first through sixth groups, and store images classified as the same group in the same folder. Also, the electronic apparatus 100 may determine keywords respectively corresponding to images included in a group.

FIGS. 6A and 6B are diagrams illustrating an example method of classifying a plurality of images using a feature extraction model and a classification model, which are trained using user data, according to an example embodiment of the present disclosure.

FIG. 6A illustrates a result of classifying a plurality of images using a feature extraction model and a classification model, which are trained using data of a first user.

Referring to FIG. 6A, images of the first user may include first through eleventh images B1, B2, B3, B4, B5, B6, B7, B8, B9, B10 and B11. Here, the images of the first user may, for example, and without limitation, be images obtained by a first user device, and may be images stored in the first user device, images captured by the first user device, or images received from an external apparatus, or the like.

The first user device according to an embodiment may classify the first through eleventh images B1 through B11 into certain groups using a first feature extraction model and a first classification model. The first feature extraction model and the first classification model may be a feature extraction model and a classification model, which are trained using the images of the first user.

The first feature extraction model extracts a deep feature of each of the images of the first user, and the first classification model may classify the images of the first user into certain groups based on the deep feature of each of the images of the first user. Here, the type or number of the certain groups into which the images of the first user are classified may be determined by the first feature extraction model and the first classification model via user data-based learning, or may be set based on a user input. For example, from among the images of the first user, the first and second images B1 and B2 may be classified into a first group, the seventh and eighth images B7 and B8 may be classified into a second group, the third, sixth, and ninth images may be classified into a third group, the tenth and eleventh images B10 and B11 may be classified into a fourth group, the fourth and fifth images B4 and B5 may be classified into a fifth group, and the third and ninth images B3 and B9 may be classified into a sixth group.

Also, the first user device may generate group names of the first through sixth groups into which the first through eleventh images B1 through B11 are classified automatically or based on a user input. For example, the first user device may generate the group names or keywords automatically by using deep feature information and a language model of the first through eleventh images B1 through B11 included in the first through sixth groups.

For example, the first group may have a group name "food", the second group may have a group name "dog", the third group may have a group name "landscape", the fourth group may have a group name "person", the fifth group may have a group name "document", and the sixth group may have a group name "road".

FIG. 6B illustrates a result of classifying a plurality of images using a feature extraction model and a classification model, which are trained using data of a second user.

Referring to FIG. 6B, images of the second user may include first through eleventh images C1, C2, C3, C4, C5, C6, C7, C8, C9, C10 and C11. Here, the images of the second user may, for example, and without limitation, be images obtained by a second user device, and may be images stored in the second user device, images captured by the second user device, or images received from an external apparatus, or the like.

The second user device according to an embodiment may classify the first through eleventh images C1 through C11 into certain groups using a second feature extraction model and a second classification model. The second feature extraction model and the second classification model may be a feature extraction model and a classification model, which are trained using the images of the second user.

The second feature extraction model extracts a deep feature of each of the images of the second user, and the second classification model may classify the images of the second user into certain groups based on the deep feature of each of the images of the second user. Here, the type or number of the certain groups into which the images of the second user are classified may be determined by the second feature extraction model and the second classification model via user data-based learning, or may be set based on a user input. For example, from among the images of the second user, the first, third, and seventh images C1, C3, and C7 may be classified into a first group, the second and ninth images C2 and C9 may be classified into a second group, the third and sixth images C3 and C6 may be classified into a third group, the fourth and fifth images C4 and C5 may be classified into a fourth group, the seventh and eighth images C7 and C8 may be classified into a fifth group, the tenth and eleventh images C10 and C11 may be classified into a sixth group, and the first, fifth, and eleventh images C1, C5, and C11 may be classified into a seventh group.

Also, the second user device may generate group names of the first through seventh groups into which the first through eleventh images C1 through C11 are classified automatically or based on a user input. The second user device may generate the group names or keywords automatically by using deep feature information and a language model of the first through eleventh images C1 through C11 included in the first through seventh groups.

For example, the first group may have a group name "road", the second group may have a group name "river", the third group may have a group name "traditional Korean house", the fourth group may have a group name "beach", the fifth group may have a group name "forest", the sixth group may have a group name "building", and the seventh group may have a group name "sky".

As described with reference to FIGS. 6A and 6B, a feature extraction model and a classification model according to an embodiment may be trained and updated using user data.

A feature extraction model and a classification model, which are updated according to an embodiment, may re-classify a plurality of images included in a first group from among pre-classified groups into at least two groups, or may re-classify a plurality of images included in first and second groups, from among pre-classified groups, into one group. For example, the first feature extraction model and the first classification model, which are optimized for the images of the first user, may classify the third and sixth images B3 and B6 into one group (the "landscape" group). On the other hand, the second feature extraction model and the second classification model, which are optimized for the images of the second user, may classify the first image C1, which is the same as the third image B3, and the fifth image C5, which is the same as the image B6, into different groups (the "road" group and the "beach" group).

Accordingly, the electronic apparatus 100 according to an embodiment provides a feature extraction model and a classification model, which are optimized according to users, and thus a plurality of images may be classified using classification criteria optimized according to users, instead of one classification criterion.

Figure 7A:
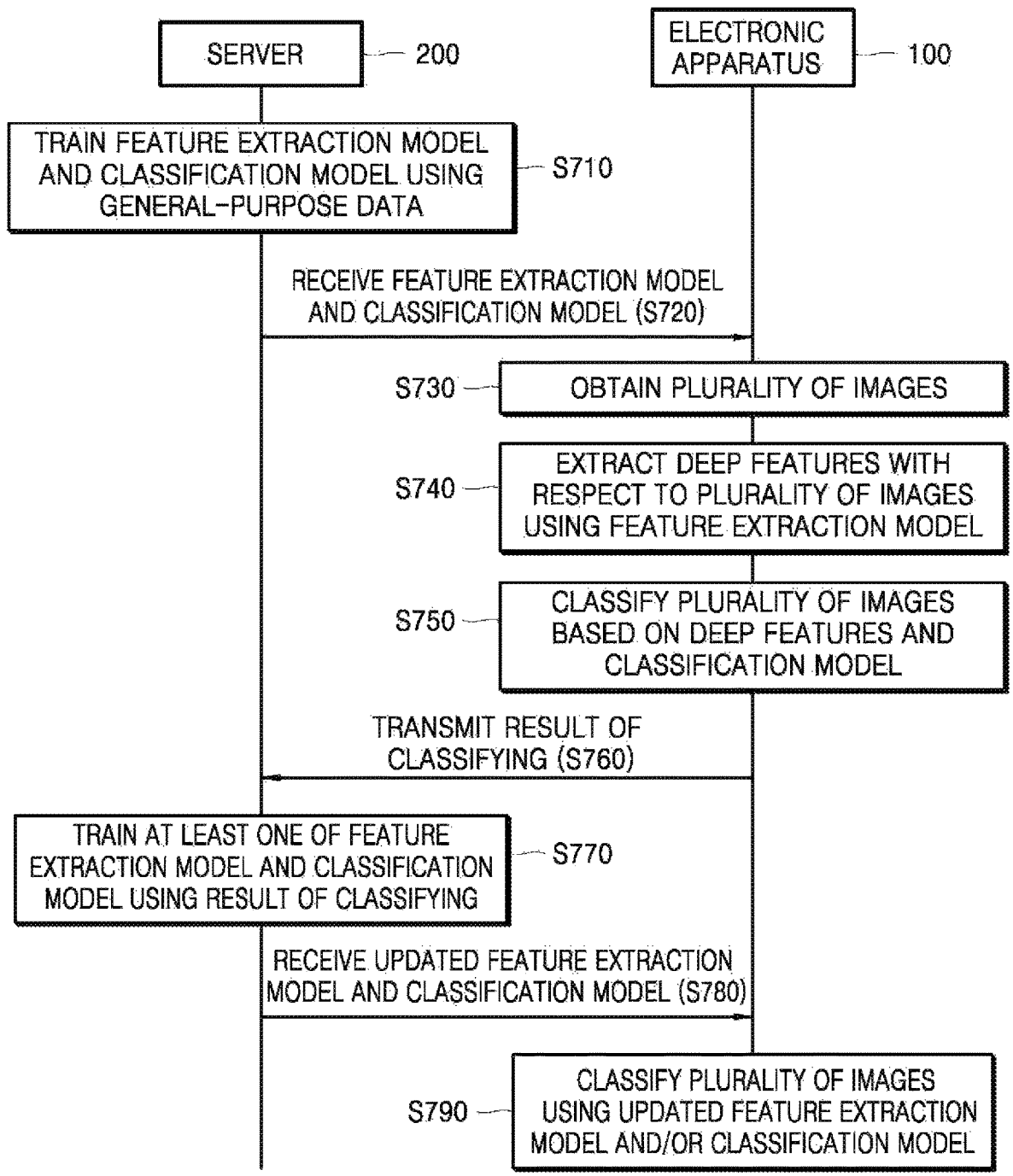
FIG. 7A is a flowchart illustrating example operations of a server and an electronic apparatus, according to an example embodiment of the present disclosure.

FIG. 7A is a flowchart illustrating example operations of a server 200 and the electronic apparatus 100, according to an example embodiment of the present disclosure.

Referring to FIG. 7A, the server 200 may train a feature extraction model and a classification model using general-purpose data, in operation S710.

For example, the server 200 may train a criterion of classifying images, based on the general-purpose data. The server 200 may train a criterion of extracting deep features of a plurality of images, based on the general-purpose data. Also, the server 200 may train to classify the plurality of images into certain groups, based on similarity between the deep features of the plurality of images.

The electronic apparatus 100 may receive the feature extraction model and the classification model from the server 200, in operation S720.

The electronic apparatus 100 may obtain the plurality of images in operation S730.

The electronic apparatus 100 may extract deep features with respect to the plurality of images using the feature extraction model received from the server 200, in operation S740.

The electronic apparatus 100 may classify the plurality of images based on the classification model received from the server 200 and the extracted deep features, in operation S750.

Operations S730 through S750 may, for example, respectively correspond to operations S210 through S230 of FIG. 2.

The electronic apparatus 100 may transmit a result of classifying the plurality of images to the server 200, in operation S760.

The server 200 may determine whether the feature extraction model and/or the classification model need to be updated using the result received from the electronic apparatus 100, and train and update at least one of the feature extraction model and the classification model, in operation S770.

The electronic apparatus 100 may receive the trained and updated feature extraction model and classification model from the server 200, in operation S780.

The electronic apparatus 100 may classify the plurality of images using the updated feature extraction model and/or classification model, in operation S790.

Also, the electronic apparatus 100 may re-extract the deep features of the pre-classified plurality of images, and re-classify the plurality of images based on the re-extracted deep features.

Meanwhile, operations S710 through S790 of FIG. 7A may each be performed by the electronic apparatus 100 or the server 200 according to an embodiment. For example, in FIG. 7A, operations S710 through S770 are performed by the server 200, but an embodiment is not limited thereto, and may be performed by the electronic apparatus 100. Also, in FIG. 7A, operations S730 through S750, and S790 are performed by the electronic apparatus 100, but an embodiment is not limited thereto, and may be performed by the server 200.

Figure 7B:
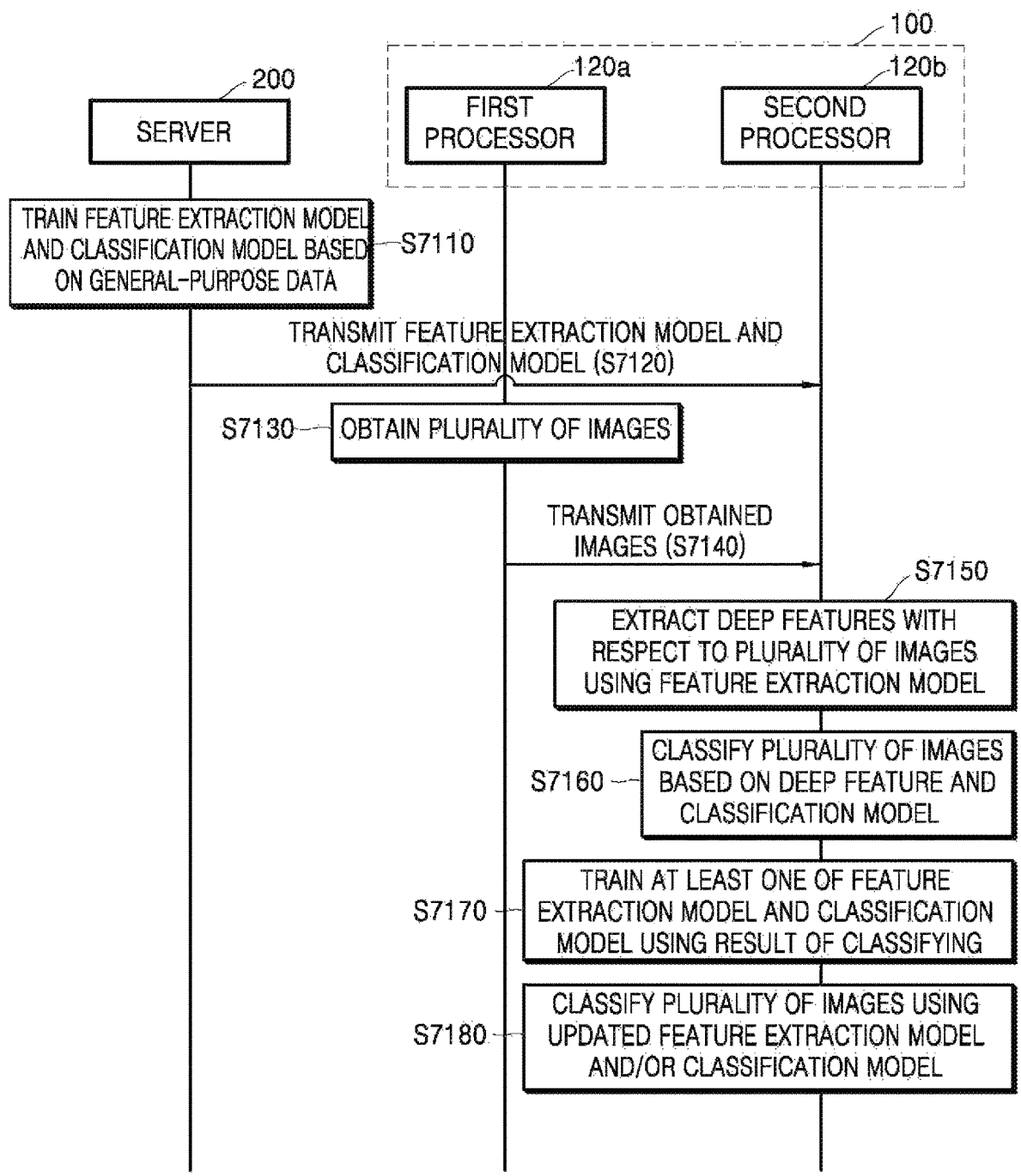
FIG. 7B is a flowchart illustrating an example method of operating a server, a first processor, and a second processor, according to an example embodiment of the present disclosure.

FIG. 7B is a flowchart illustrating an example method of operating the server 200, a first processor 120a, and a second processor 120b, according to an example embodiment of the present disclosure.

Referring to FIG. 7B, the electronic apparatus 100 may include the first processor 120a and the second processor 120b.

The first processor 120a may, for example, control execution of at least one application installed in the electronic apparatus 100, and perform graphic processing on an image (for example, a live-view image or a captured image) obtained by the electronic apparatus 100. The first processor 120a may include various processing circuitry and be embodied in a form of a system-on-chip (SoC) in which functions of a central processing unit (CPU), a graphic processing unit (GPU), a communication ship, and a sensor, are integrated. Also, the first processor 120a may be described as an application processor (AP) herein.

The second processor 120b may classify images using a feature extraction model and a classification model.

Meanwhile, the second processor 120b may, for example, be manufactured in a form of an AI exclusive hardware chip that performs an image classification function using a data recognition model (for example, a feature extraction model and a data classification model). According to an embodiment, the AI exclusive hardware chip may include GPU for the data recognition model using visual understanding as an element technology.

Also, the electronic apparatus 100 may include a third processor or a fourth processor that performs all or some functions of the second processor 120b instead of the second processor 120b.

According to an embodiment, functions performed by the first processor 120a may be performed by applications that are stored in a memory and perform various functions. Functions performed by the second processor 120b may be performed by an operating system (OS) of the electronic apparatus 100.

For example, a camera application may generate an image and transmit the image to an OS including a data recognition model. Also, a gallery application that displays an image may receive, from the OS, images extracted by using the image transmitted to the OS and display the extracted images on a display.

Referring to FIG. 7B, the server 200 may train a feature extraction model and a classification model based on general-purpose data, in operation S7110.

The server 200 may transmit the feature extraction model and the classification model to the electronic apparatus 100. For example, the electronic apparatus 100 may be set such that the second processor 120b may use the feature extraction model and the classifying mode, in operation S7120.

The first processor 120a may obtain a plurality of images in operation S7130.

The first processor 120a may transmit the obtained images to the second processor 120b, in operation S7140.

The second processor 120b may extract deep features with respect to the plurality of images using the feature extraction model received from the server 200, in operation S7150.

The second processor 120b may classify the plurality of images based on the classification model received from the server 200 and the extracted deep features, in operation S7160.

The second processor 120b may determine whether the feature extraction model and/or the classification model need to be updated, and train and update at least one of the feature extraction model and/or the classification model, in operation S7170.

The second processor 120b may classify the plurality of images using the updated feature extraction model and/or classification model, in operation S7180.

Also, the second processor 120b may re-extract the deep features of the pre-classified plurality of images, and re-classify the plurality of images based on the re-extracted deep features.

Figure 7C:
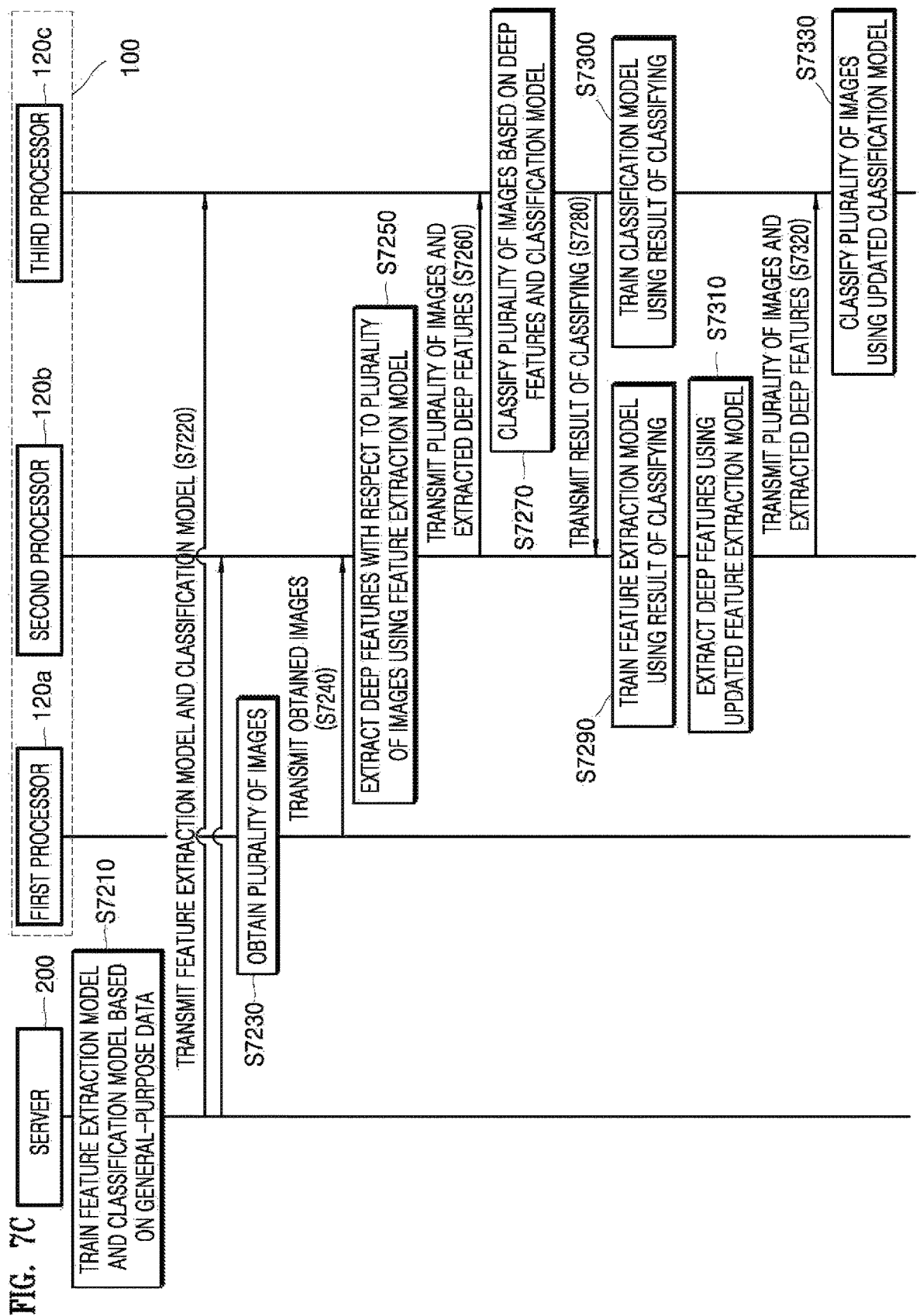
FIG. 7C is a flowchart illustrating an example method of operating a server, a first processor, a second processor, and a third processor, according to an example embodiment of the present disclosure.

FIG. 7C is a flowchart illustrating an example method of operating the server 200, the first processor 120a, the second processor 120b, and a third processor 120c, according to an example embodiment of the present disclosure.

Referring to FIG. 7C, the electronic apparatus 100 may include the first processor 120a, the second processor 120b, and the third processor 120c.

Referring to FIG. 7C, the server 200 may train a feature extraction model and a classification model based on general-purpose data, in operation S7210.

The server 200 may transmit the feature extraction model and the classification model to the electronic apparatus 100 in operation S7220. For example, the electronic apparatus 100 may be set such that the second processor 120b uses the feature extraction model and the third processor 120c uses the classification model.

The first processor 120a may obtain a plurality of images in operation S7230.

The first processor 120a may transmit the obtained images to the second processor 120b, in operation S7240.

The second processor 120b may extract deep features with respect to the plurality of images using the feature extraction model received from the server 200, in operation S7250.

The second processor 120b may transmit the extracted deep features and the images to the third processor 120c, in operation S7260.

The third processor 120c may classify the plurality of images based on the deep features and the classification model, in operation S7270.

The third processor 120c may transmit a result of the classifying to the second processor 120b, in operation S7280.

The second processor 120b may determine whether the feature extraction model needs to be updated and train the feature extraction model using the result of the classifying, in operation S7290.

The third processor 120c may determine whether the classification model needs to be updated, and train the classification model using the result of the classifying, in operation S7300.

The second processor 120b may extract deep features of the plurality of images using the updated feature extraction model in operation S7310. Also, the second processor 120b may re-extract deep features of the plurality of images from which the deep features are pre-extracted.

The second processor 120b may transmit the plurality of images and the extracted deep features to the third processor 120c, in operation S7320.

The third processor 120c may classify the plurality of images using the updated classification model, in operation S7330. Also, the third processor 120c may re-classify the plurality of images that are pre-classified.

Figure 8A:
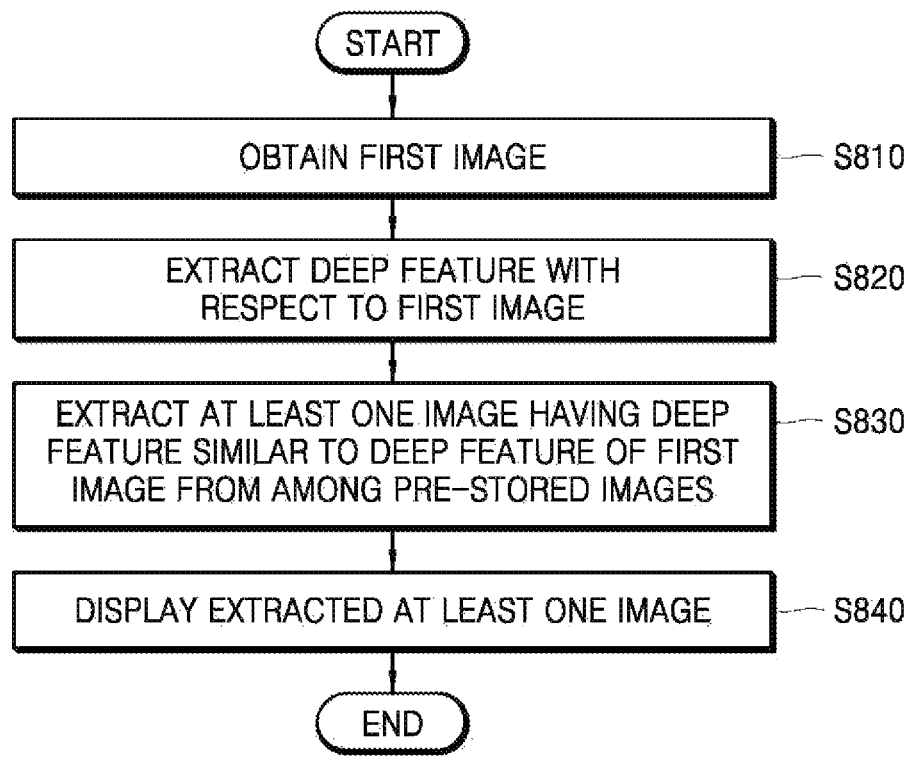
FIG. 8A is a flowchart illustrating an example method of operating an electronic apparatus, according to an example embodiment of the present disclosure.

FIG. 8A is a flowchart illustrating an example method of operating the electronic apparatus 100, according to an example embodiment of the present disclosure.

Referring to FIG. 8A, the electronic apparatus 100 may obtain a first image, in operation S810. Here, the first image may be an image captured by or pre-stored in the electronic apparatus 100. Alternatively, the first image may be received from an external apparatus.

The electronic apparatus 100 may extract a deep feature with respect to the first image by using the feature extraction model, in operation S820. For example, the electronic apparatus 100 may extract the deep feature of the first image by inputting the first image into at least one neural network included in the feature extraction model.

The electronic apparatus 100 may extract at least one image having a deep feature similar to the deep feature of the first image from among pre-stored images, in operation S830.

The electronic apparatus 100 may extract an image similar to the first image based on similarity between the deep feature of the first image and deep features of the pre-stored images, by, for example, using a classification model. For example, the electronic apparatus 100 may extract, from the pre-stored images, an image of which a difference value from a vector of the deep feature of the first image is within a pre-set range.

The electronic apparatus 100 may display the extracted image on a display in operation S840.

Figure 8B:
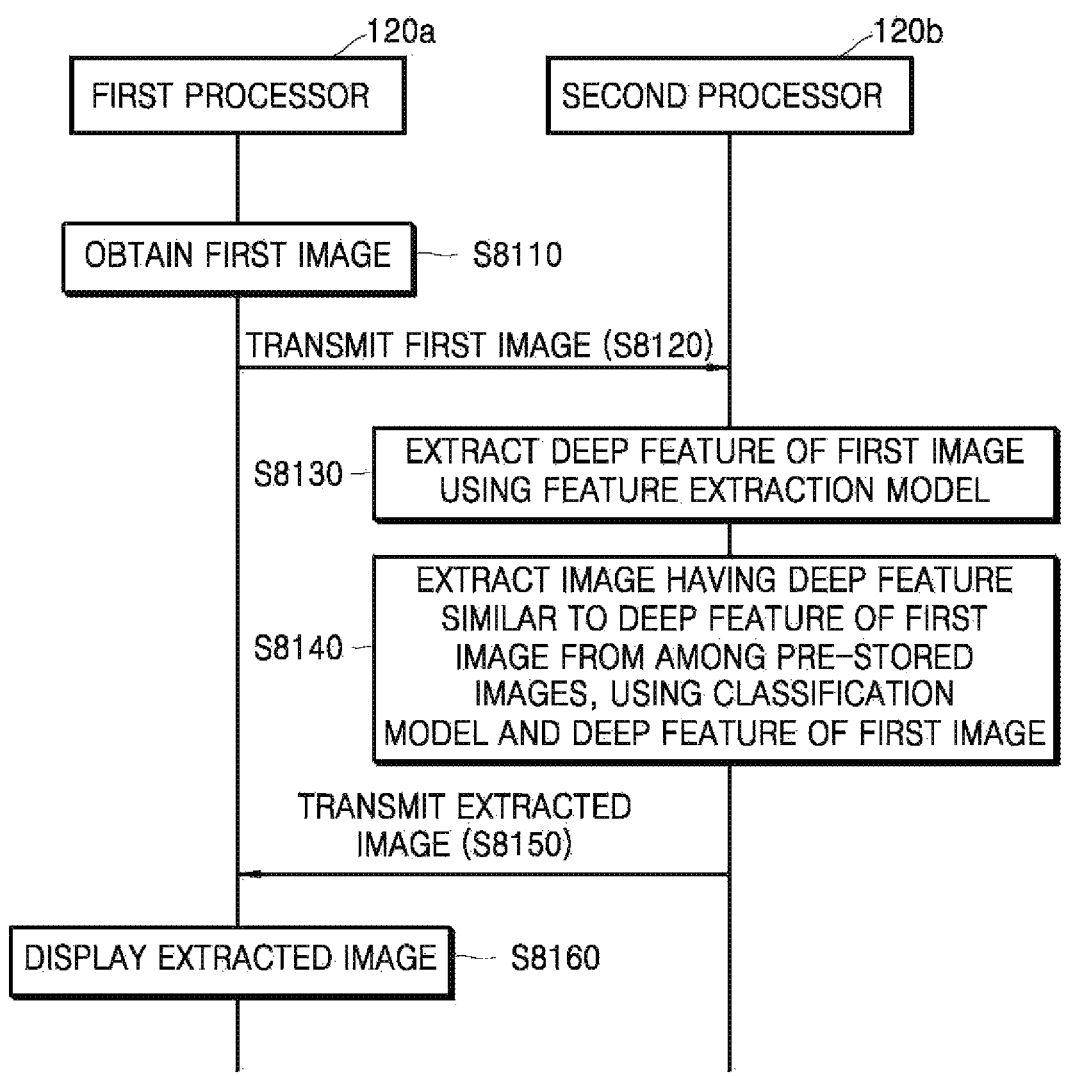
FIG. 8B is a flowchart illustrating an example method of operating a first processor and a second processor included in an electronic apparatus, according to an example embodiment of the present disclosure.

FIG. 8B is a flowchart illustrating an example method of operating the first processor 120a and the second processor 120b included in the electronic apparatus 100, according to an example embodiment of the present disclosure.

Referring to FIG. 8B, the electronic apparatus 100 may include the first processor 120a and the second processor 120b.

Referring to FIG. 8B, the first processor 120a may obtain a first image in operation S8110.

The first processor 120a may transmit the first image to the second processor 120b in operation S8120.

The second processor 120b may extract a deep feature with respect to the first image using a feature extraction model, in operation S8130.

The second processor 120b may extract at least one image having a deep feature similar to the deep feature of the first image, from among pre-stored images, using a classification model and the deep feature of the first image, in operation S8140. For example, the second processor 120b may extract, from the pre-stored images, an image of which a difference value from a vector of the deep feature of the first image is within a pre-set range.

The second processor 120*b* may transmit the extracted at least one image to the first processor 120*a* in operation S8150.

The first processor 120*a* may display the extracted at least one image on a display in operation S8160.

Figure 8C:
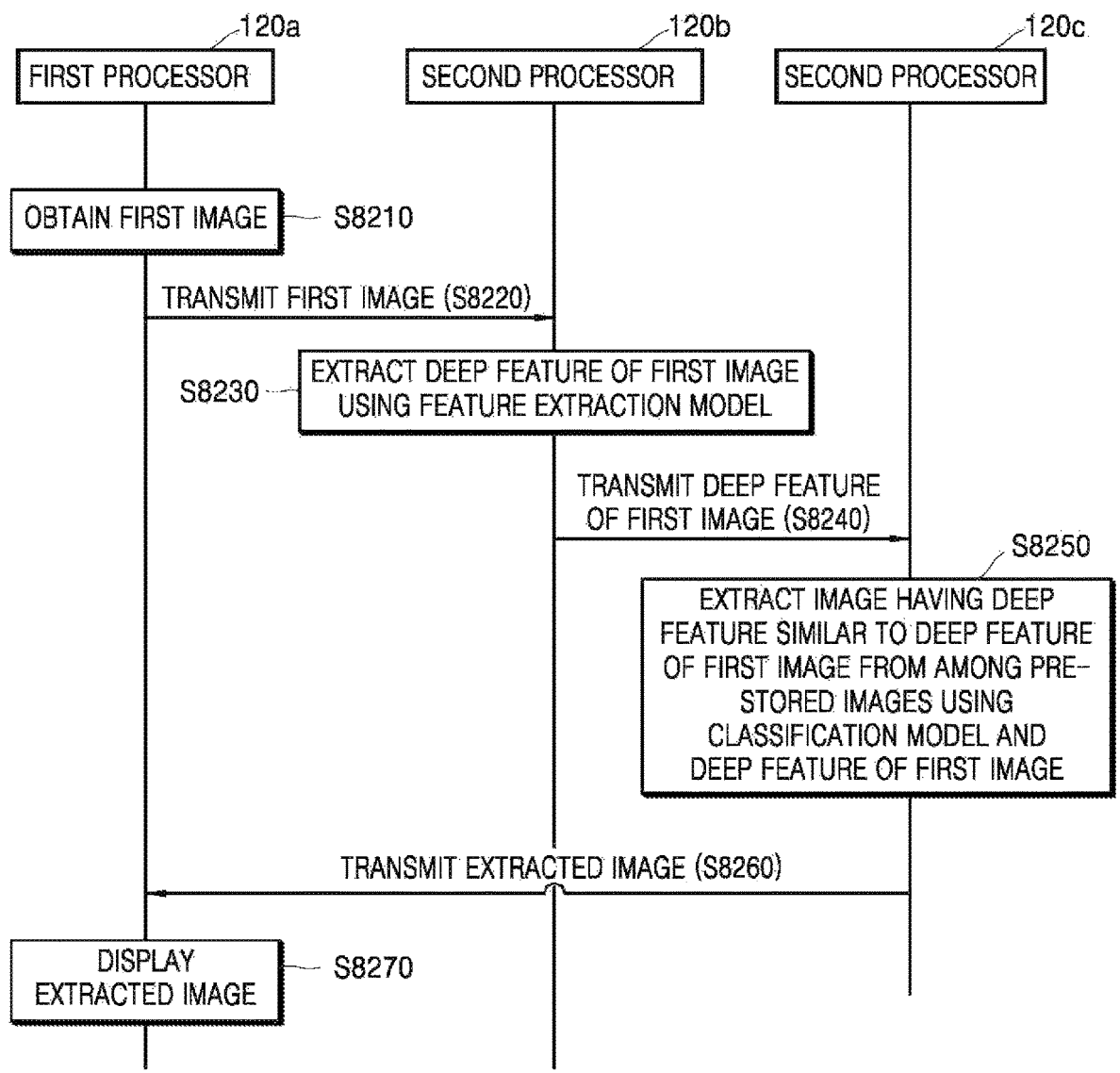
FIG. 8C is a flowchart illustrating an example method of operating a first processor, a second processor, and a third processor included in an electronic apparatus, according to an example embodiment of the present disclosure.

FIG. 8C is a flowchart illustrating an example method of operating the first processor 120*a*, the second processor 120*b*, and the third processor 120*c* included in the electronic apparatus 100, according to an example embodiment.

Referring to FIG. 8C, the electronic apparatus 100 may include the first processor 120*a*, the second processor 120*b*, and the third processor 120*c*.

Referring to FIG. 8C, the first processor 120*a* may obtain a first image in operation S8210.

The first processor 120*a* may transmit the first image to the second processor 120*b* in operation S8220.

The second processor 120*b* may extract a deep feature with respect to the first image using a feature extraction model in operation S8230.

The second processor 120*b* may transmit the deep feature with respect to the first image to the third processor 120*c* in operation S8240.

The third processor 120*c* may extract at least one image having a deep feature similar to the deep feature of the first image from among pre-stored images, using a classification model and the deep feature of the first image, in operation S8250. For example, the second processor 120*b* may extract, from the pre-stored images, an image of which a difference value from a vector of the deep feature of the first image is within a pre-set range.

The third processor 120*c* may transmit the extracted at least one image to the first processor 120*a* in operation S8260.

The first processor 120*a* may display the extracted at least one image on a display in operation S8270.

Figure 9:
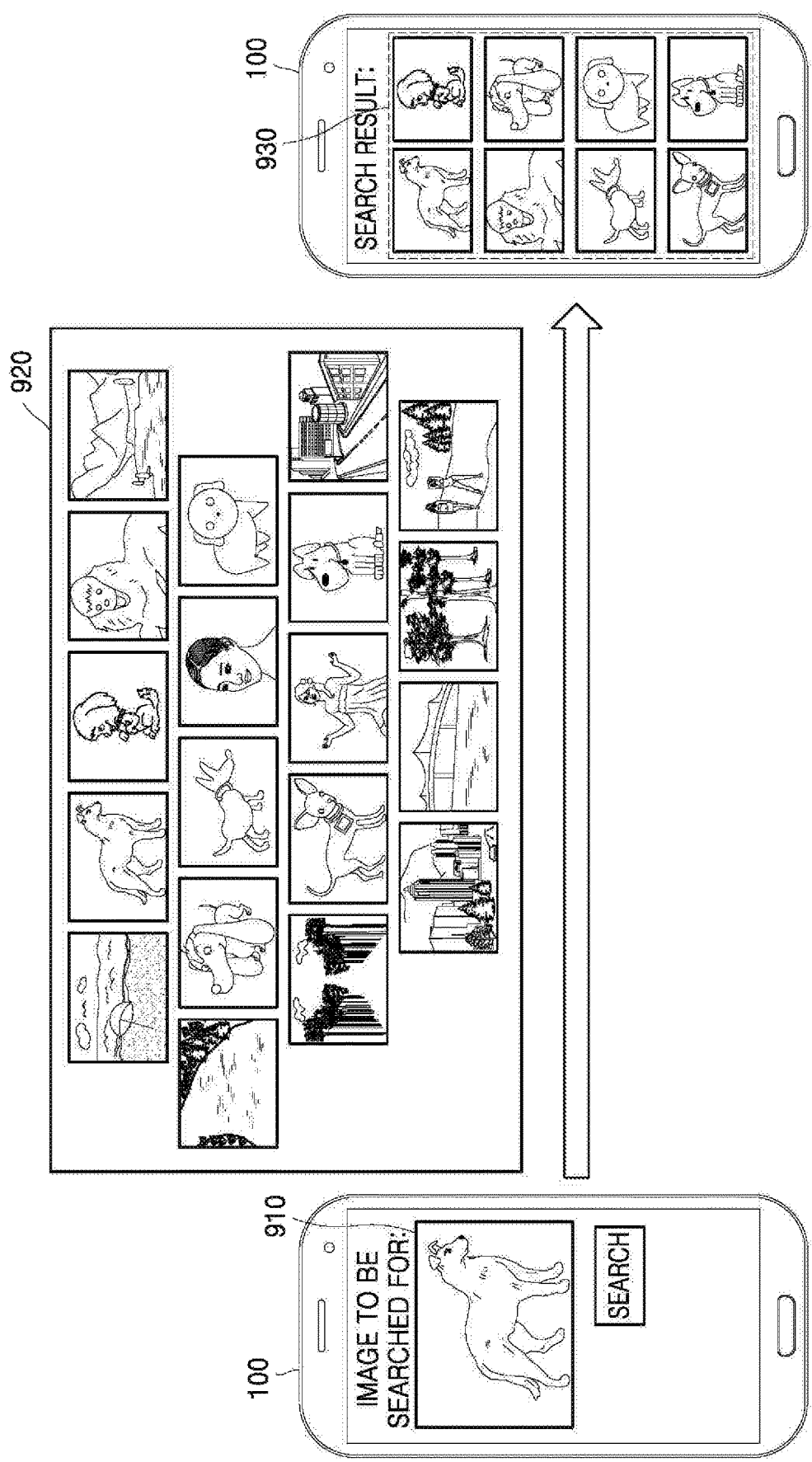
FIGS. 9 and 10 are diagrams illustrating an example method of searching for an image, the method performed by an electronic apparatus, according to an example embodiment of the present disclosure.
Figure 10:
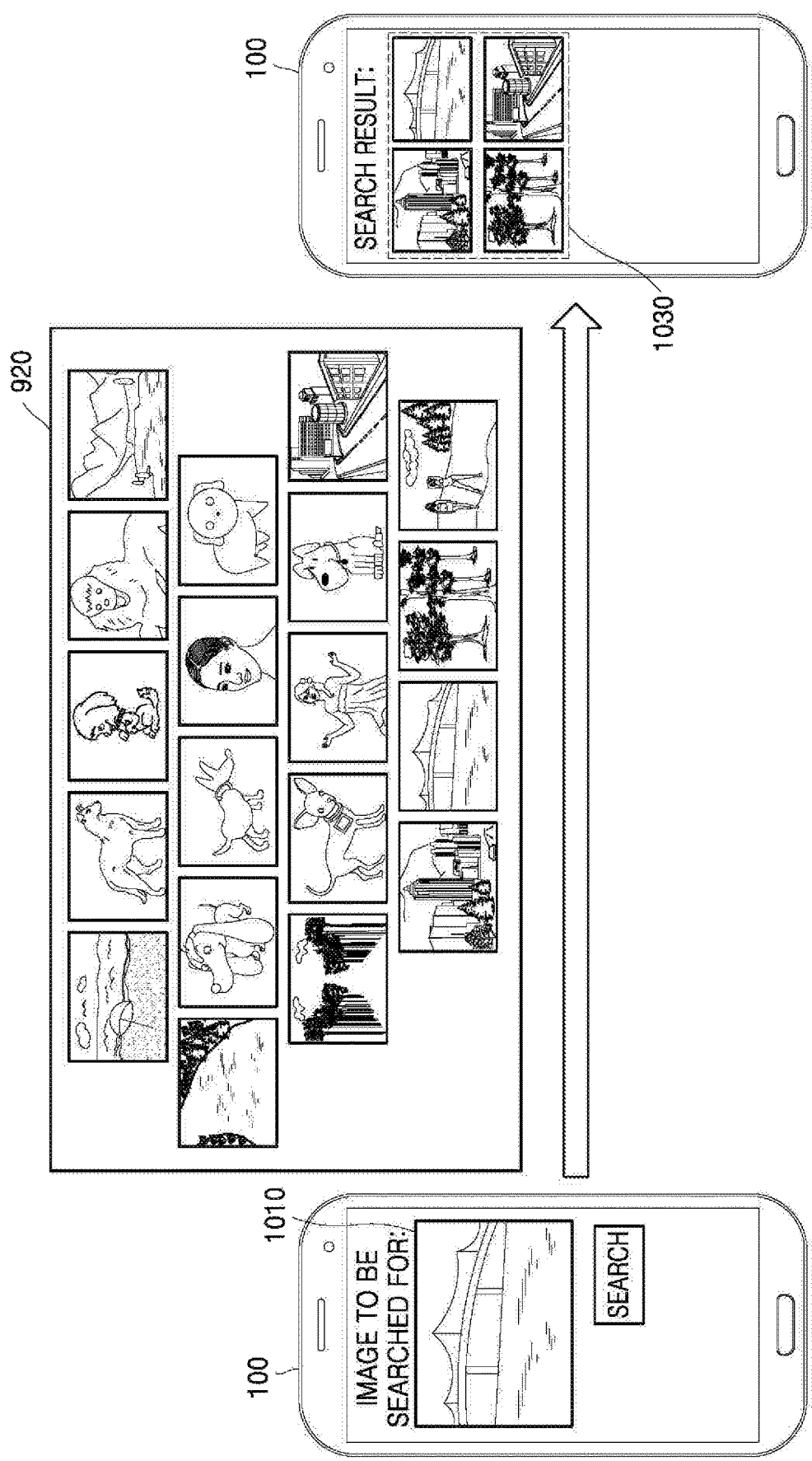

FIGS. 9 and 10 are diagrams illustrating an example method of searching for an image, the method performed by the electronic apparatus 100, according to an example embodiment of the present disclosure.

Referring to FIG. 9, the electronic apparatus 100 according to an embodiment may obtain a first image 910. Here, the first image 910 may be an image captured by or pre-stored in the electronic apparatus 100. On the other hand, the first image 910 may be an image received from an external apparatus.

The electronic apparatus 100 may extract a deep feature of the first image 910 using a feature extraction model. The feature extraction model may include at least one neural network, and the deep feature may include a vector extracted from at least one layer by inputting the first image 910 into the at least one neural network.

Here, the deep feature of the first image 910 may indicate a feature of an object included in the first image 910, for example, may indicate a feature of a 'dog', but an embodiment is not limited thereto.

The electronic apparatus 100 may search for an image similar to the first image 910 based on similarity between the deep feature of the first image 910 and deep features of a pre-stored plurality of images 920, by using a classification model. The pre-stored plurality of images 920 may include deep features extracted from each of the images 920. For example, a deep feature may be stored as EXIF information of each of a plurality of images. Here, the deep feature of the first image 910 and the deep features of the plurality of images 920 may be deep features extracted using one neural network having one version. The deep feature of the first image 910 and the deep features of the plurality of images 920 may be deep features extracted from the same sub-network of one neural network, or from the same layer of one neural network.

The electronic apparatus 100 may extract an image of which a difference value with the deep feature of the first image 910, from among the plurality of images 920, is within a pre-set range. For example, as illustrated in FIG. 9, from among the plurality of images 920, first through eighth images 930 may be extracted and displayed as images similar to the first image 910.

When a user inputs a keyword (for example, dog, beagle, or puppy) corresponding to a 'dog' so as to search for a 'dog' image, the electronic apparatus 100 may only search stored images by using the keyword, and if the user stored a 'dog' image with a keyword (for example, happy) irrelevant to a 'dog', the electronic apparatus 100 is unable to find the 'dog' image stored in the keyword irrelevant to a 'dog'. Accordingly, the user has to remember a keyword stored with respect to an image to find the image.

However, as described with reference to FIG. 9, the electronic apparatus 100 according to an embodiment extracts a deep feature of a 'dog' image using an image including a 'dog' instead of using a keyword, and search for images having a deep feature similar to the extracted deep feature, and thus the user may find a desired image without having to remember all keywords.

Also, referring to FIG. 10, the electronic apparatus 100 according to an example embodiment may obtain a second image 1010. The electronic apparatus 100 may extract a deep feature of the second image 1010 using a feature extraction model. The deep feature of the second image 1010 may indicate a feature of a bridge, a feature of a night view, a feature of a river, but is not limited thereto.

The electronic apparatus 100 may search for an image similar to the second image 1010 based on similarity between the deep feature of the second image 1010 and deep features of the pre-stored plurality of images 920, by using a classification model. For example, the electronic apparatus 100 may extract and display, from among the plurality of images 920, images 1030 of which a difference value with the deep feature of the second image 1010 is within a pre-set range, as images similar to the second image 1010.

The user has to input related keywords (bridge and night view) so as to search for a 'night view with bridge' image. However, as described with reference to FIG. 10, the electronic apparatus 100 according to an embodiment extracts a deep feature of the 'night view with bridge' image by using the 'night view with bridge' image instead of using a keyword, and search for images having a deep feature similar to the extracted deep feature, and thus the user may find a desired image without having to remember all keywords.

Also, the electronic apparatus 100 may perform an image search through a keyword input. For example, when a keyword is input, the electronic apparatus 100 may determine a keyword similar to the input keyword by using a language model, and search for images corresponding to the similar keyword. When a tag name for a first image corresponds to the similar keyword, the electronic apparatus 100 may extract the first image and display the first image as an image search result. Also, when a group name of images corresponds to the similar keyword, the electronic apparatus 100 may extract second images included in a group of the group name and display the second images as image search results. However, an embodiment is not limited thereto.

Figure 11:
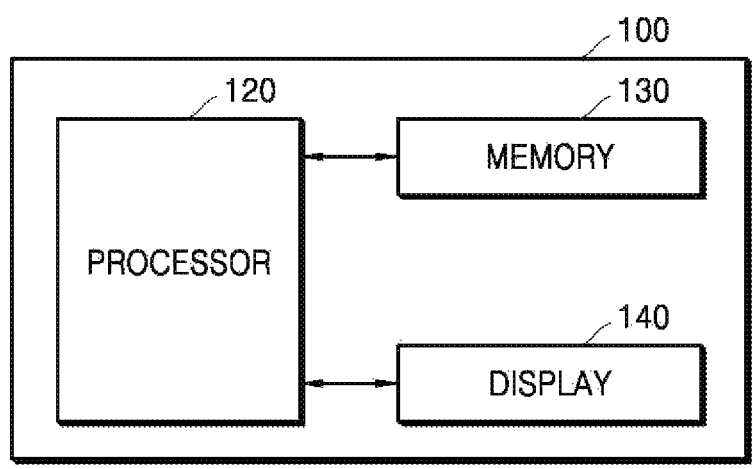
FIG. 11 is a block diagram illustrating an example configuration of an electronic apparatus, according to an example embodiment of the present disclosure.

FIG. 11 is a block diagram illustrating an example configuration of the electronic apparatus 100, according to an example embodiment of the present disclosure.

Referring to FIG. 11, the electronic apparatus 100 according to an embodiment may include a processor (e.g., including processing circuitry) 120, a display 140, and a memory 130.

The display 140 according to an embodiment generates a driving signal by converting an image signal, a data signal, an on-screen display (OSD) signal, or a control signal processed by the processor 120. The display 140 may be embodied as a plasma display panel (PDP), a liquid crystal display (PDP), a organic light-emitting display (OLED), or a flexible display, or may be embodied as a 3-dimensional (3D) display, or the like, but is not limited thereto. Also, the display 140 may be configured as a touch screen to be used as an input device as well as an output device.

The display 140 according to an embodiment may display an image. Here, the image displayed on the display 140 may be at least one of an image captured by the electronic apparatus 100, an image stored in the electronic apparatus 100, or an image received from an external apparatus. However, an embodiment is not limited thereto.

The processor 120 according to an embodiment may include various processing circuitry and execute at least one program stored in the memory 130. The processor 120 may, for example, and without limitation, include a single core, a dual core, a triple core, a quad core, or a multiple core. Also, the processor 120 may include a plurality of processors. For example, the processor 120 may include a main processor (not shown) and a sub-processor (not shown) that operates in a sleep mode.

The memory 130 according to an embodiment may store various types of data, programs, or applications for driving and controlling the electronic apparatus 100.

The program stored in the memory 130 may include at least one instruction. The program (at least one instruction) or the application stored in the memory 130 may be executed by the processor 120.

The processor 120 according to an embodiment may execute the at least one instruction stored in the memory 130 to obtain a plurality of images and extract deep features with respect to the plurality of images using a feature extraction model. For example, the feature extraction model may include a first neural network, and the processor 120 may extract a vector included in the deep feature from at least one layer of the first neural network by inputting each of the plurality of images into the first neural network. The processor 120 may classify the plurality of images into certain groups using the extracted deep features and a classification model. For example, the classification model may include a second neural network that classifies the plurality of images into the certain groups based on similarity between the deep features of the plurality of images.

Also, the processor 120 may execute the at least one instruction stored in the memory 130 to store the classified plurality of images together with the deep features. Also, the processor 120 may control the display 140 to display a result of the classifying, determine necessity of updating the feature extraction model and the classification model by using the result of the classifying, and train and update at least one of the feature extraction model and the classification model based on a result of the determining. When at least one of the feature extraction model and the classification model is updated, the processor 120 may re-classify the pre-classified plurality of images by using the updated feature extraction model and classification model.

The processor 120 may extract a deep feature with respect to a first image, and extract at least one image having a deep feature similar to the deep feature of the first image from among the classified plurality of images.

Figure 12:
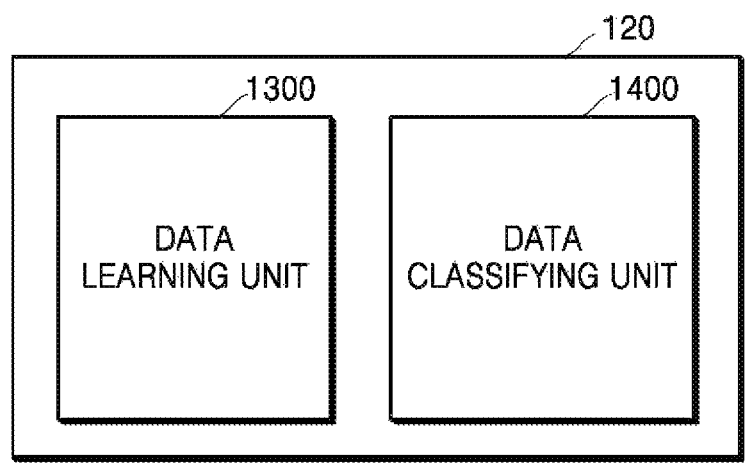
FIG. 12 is a block diagram illustrating an example processor according to an example embodiment of the present disclosure.

FIG. 12 is a block diagram illustrating the processor 120 according to an example embodiment of the present disclosure.

Referring to FIG. 12, the processor 120 according to an embodiment may include a data learning unit (e.g., including processing circuitry and/or program elements) 1300 and a data classifying unit (e.g., including processing circuitry and/or program elements) 1400.

The data learning unit 1300 may include processing circuitry and/or program elements configured to learn a determination criterion for classifying an image into a certain group. The data learning unit 1300 may learn a determination criterion about which data is to be used to classify an image into a certain group and how to classify an image by using data. The data learning unit 1300 may obtain data to be used for learning, and learn a determination criterion for classifying an image by applying the data to a data classification model described later. The data classification model according to an embodiment may include a feature extraction model and a classification model.

The data classifying unit 1400 may classify an image based on the data. The data classifying unit 1400 may classify a plurality of images into certain groups using the learned data classification model. The data classifying unit 1400 may obtain certain data according to standards pre-set via learning, and classify an image based on the certain data using the data classification model in which the obtained certain data is used as an input value. Also, a result value output by the data classification model in which the obtained certain data is used as an input value may be used to update the data classification model.

The data learning unit 1300 and the data classifying unit 1400 may be manufactured in a form of at least one hardware chip and included in an electronic apparatus. For example, at least one of the data learning unit 1300 and the data classifying unit 1400 may be manufactured in a form of an artificial intelligence (AI)-exclusive hardware chip or may be manufactured as part of an existing general-purpose processor (for example, a central processing unit (CPU) or an application processor) or a graphic-exclusive processor (for example, a graphical processing unit (GPU)), and included in any electronic apparatus.

In this case, the data learning unit 1300 and the data classifying unit 1400 may be included in one electronic apparatus or in different electronic apparatuses. For example, one of the data learning unit 1300 and the data classifying unit 1400 may be included in an electronic apparatus and the other one may be included in a server. Alternatively, in the data learning unit 1300 and the data classifying unit 1400, model information built by the data learning unit 1300 may be provided to the data classifying unit 1400 or data input to the data classifying unit 1400 may be provided to the data learning unit 1300 as additional learning data, via wires or wirelessly.

Meanwhile, at least one of the data learning unit 1300 and the data classifying unit 1400 may be implemented in a software module. When at least one of the data learning unit 1300 and the data classifying unit 1400 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 13:
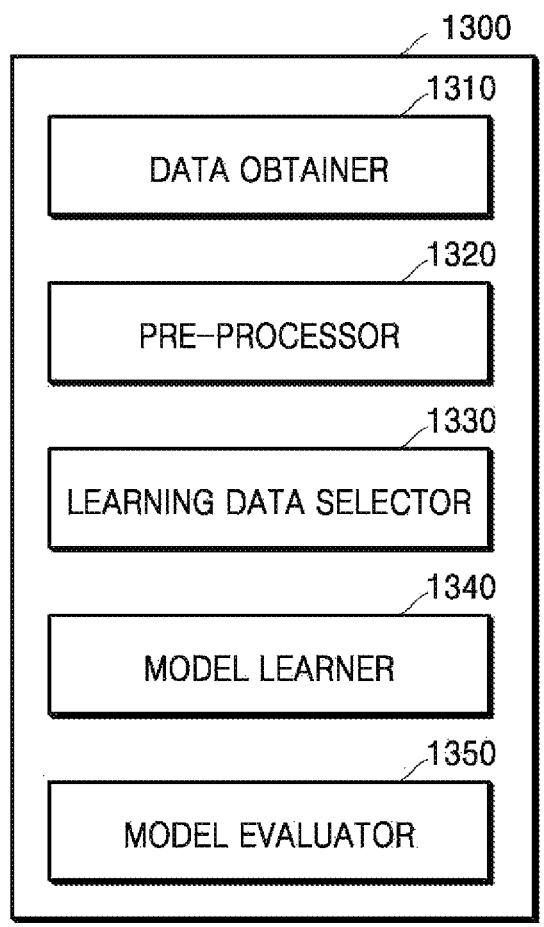
FIG. 13 is a block diagram illustrating an example data learning unit according to an example embodiment of the present disclosure.

FIG. 13 is a block diagram illustrating an example data learning unit 1300 according to an example embodiment of the present disclosure.

Referring to FIG. 13, the data learning unit 1300 according to an embodiment may include a data obtainer (e.g., including processing circuitry and/or program elements) 1310, a pre-processor (e.g., including processing circuitry and/or program elements) 1320, a learning data selector (e.g., including processing circuitry and/or program elements) 1330, a model learner (e.g., including processing circuitry and/or program elements) 1340, and a model evaluator (e.g., including processing circuitry and/or program elements) 1350, but is not limited thereto. According to an embodiment, the data learning unit 1300 may include some of the above components. For example, the data learning unit 1300 may only include the data obtainer 1310 and the model learner 1340. Also, according to an embodiment, the data learning unit 1300 may further include a component other than the above components.

The data obtainer 1310 may obtain data required to classify a plurality of images into certain groups. The data obtainer 1310 may obtain data required to learn to classify an image.

The data obtainer 1310 may obtain a plurality of pieces of image data. For example, the data obtainer 1310 may receive image data through a camera of an electronic apparatus including the data learning unit 1300. Alternatively, the data obtainer 1310 may receive image data through an external apparatus communicable with the electronic apparatus including the data learning unit 1300.

The pre-processor 1320 may pre-process the obtained data such that the obtained data may be used during the learning for classifying an image. The pre-processor 1320 may process the obtained data to a pre-set format such that the obtained data is used by the model train 1340 described later.

The learning data selector 1330 may select data required for learning from the pre-processed data. The selected data may be provided to the model learner 1340. The learning data selector 1330 may select data required for learning from the pre-processed data according to a pre-set criterion for classifying an image. Also, the learning data selector 1330 may select data according to a criterion pre-set via learning of the model learner 1340 described later.

The model learner 1340 may learn a determination criterion about how to classify images based on learning data. Also, the model learner 1340 may learn a selection criterion about which learning data is to be used to classify an image.

For example, the model learner 1340 may learn a determination criterion of extracting deep features of a plurality of images, and learn to classify the plurality of images into certain groups based on similarity between the deep features of the plurality of images. Here, similarity between deep features may be indicated by a distance between vectors extracted from the deep features, wherein the similarity is high when the distance between the vectors is short, and the similarity is low when the distance between the vectors is long. Also, a plurality of images of which a distance between vectors is within a pre-set range may be classified into one group.

Also, the model learner 1340 may train a data classification model for classifying a plurality of images, by using learning data. At this time, the data classification model may be a pre-built model. For example, the data classification model may be pre-built by receiving basic learning data (for example, a sample image).

The data classification model may be built considering an application field of the data application model, a learning purpose, or a computer performance of an electronic apparatus. The data classification model may be, for example, a neural network-based model. For example, DNN, CNN, RNN, or BRDNN, or the like, may be used as the data classification model, but an embodiment is not limited thereto.

According to an embodiment, when there are a plurality of pre-built data classification model, the model learner 1340 may determine, as a data classification model to be learned, a data classification model having high relevance between input learning data and basic learning data. In this case, the basic learning data may be pre-classified according to data types, and the data classification models may be pre-built according to data types. For example, the basic learning data may be pre-classified based on various standards, such as a region where the basic learning data is generated, a time when the basic learning data is generated, a size of the basic learning data, a genre of the basic learning data, a generator of the basic learning data, and a type of an object in the basic learning data.

Also, the model learner 1340 may train, for example, the data classification model using a training algorithm including error back-propagation or gradient descent.

Also, the model learner 1340 may train the data classification model via, for example, supervised learning that uses learning data as an input value. Also, the model learner 1340 may train the data classification model via unsupervised learning, in which a criterion for determining a situation is found by self-learning a type of data required to determine a situation without separate supervision. Also, the model learner 1340 may train the data classification model via, for example, reinforcement learning that uses a feedback about whether a result of image classification is correct.

Also, after the data classification model is trained, the model learner 1340 may store the trained data classification model. At this time, the model learner 1340 may store the data classification model in a memory of an electronic apparatus including the data classifying unit 1400. The model learner 1340 may store the trained data classification model in a memory of an electronic apparatus including the data classifying unit 1400 to be described later. The model learner 1340 may store the trained data classification model in a memory of a server connected to the electronic apparatus via a wired network or a wireless network.

Here, the memory in which the trained data classification model is stored may also store, for example, an instruction or data related to another at least one component of the electronic apparatus. Also, the memory may store software and/or a program. The program may include, for example, a kernel, middleware, an application programming interface (API) and/or an application program (or "application").

The model evaluator 1350 may input evaluation data into the data classification model, and when recognition results output from the evaluation data does not satisfy a certain standard, enable the model learner 1340 to train the data classification model again. Here, the evaluation data may be data pre-set to evaluate the data classification model.

For example, the model evaluator 1350 may determine that the recognition results does not satisfy the certain standard when the number or proportion of pieces of evaluation data of which classification results are not accurate exceeds a pre-set threshold value, from among classification results of the trained data classification model with respect to the evaluation data. For example, when the certain standard is 2% and the trained data recognition model outputs wrong recognition results with respect to over 20 pieces of evaluation data from among 1000 pieces of evaluation data, the model evaluator 1350 may determine that the trained data classification model is not suitable.

Meanwhile, when there a plurality of the trained data classification models, the model evaluator 1350 may evaluate whether each of the trained data classification models satisfies the certain standard, and determine the trained data classification model that satisfies the certain standard as a final data classification model. Here, when there a plurality of data classification models that satisfy the certain standard, the model evaluator 1350 may determine, as the final data classification mode, one or a pre-set number of data classification models in an order of high evaluation scores.

Meanwhile, at least one of the data obtainer 1310, the pre-processor 1320, the learning data selector 1330, the model learner 1340, and the model evaluator 1350 in the data learning unit 1300 may be manufactured in at least one hardware chip form and included in an electronic apparatus. For example, at least one of the data obtainer 1310, the pre-processor 1320, the learning data selector 1330, the model learner 1340, and the model evaluator 1350 may be manufactured in an AI-exclusive hardware chip or may be manufactured as part of an existing general-purpose processor (for example, CPU or an application processor) or a graphic-exclusive processor (for example, GPU), and included in any electronic apparatus described above.

Also, the data obtainer 1310, the pre-processor 1320, the learning data selector 1330, the model learner 1340, and the model evaluator 1350 may be included in one electronic apparatus or on different electronic apparatuses. For example, some of the data obtainer 1310, the pre-processor 1320, the learning data selector 1330, the model learner 1340, and the model evaluator may be included in an electronic apparatus, and the remainder may be included in a server.

Also, at least one of the data obtainer 1310, the pre-processor 1320, the learning data selector 1330, the model learner 1340, and the model evaluator 1350 may be implemented in a software module. When at least one of the data obtainer 1310, the pre-processor 1320, the learning data selector 1330, the model learner 1340, and the model evaluator 1350 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 14:
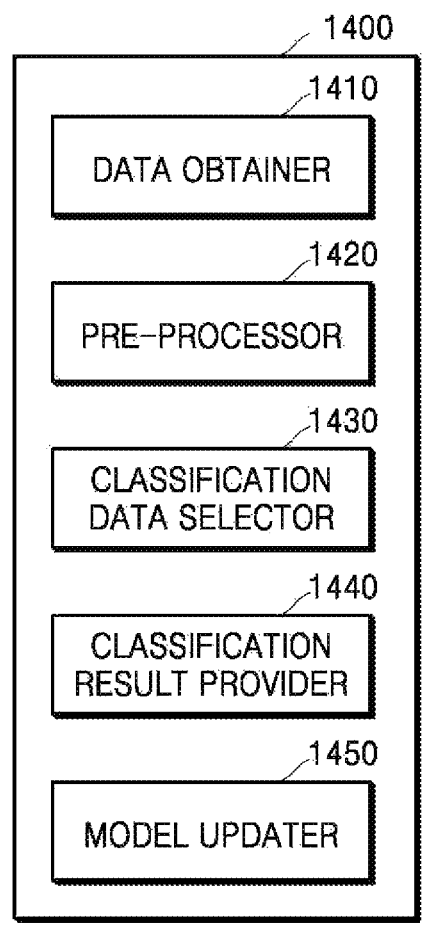
FIG. 14 is a block diagram illustrating an example data classifying unit according to an example embodiment of the present disclosure.

FIG. 14 is a block diagram illustrating an example data classifying unit 1400 according to an example embodiment of the present disclosure.

Referring to FIG. 14, the data classifying unit 1400 according to an embodiment may include a data obtainer (e.g., including processing circuitry and/or program elements) 1410, a pre-processor (e.g., including processing circuitry and/or program elements) 1420, a classification data selector (e.g., including processing circuitry and/or program elements) 1430, a classification result provider (e.g., including processing circuitry and/or program elements) 1440, and a model updater (e.g., including processing circuitry and/or program elements) 1450. However, an embodiment is not limited thereto. According to an embodiment, the data classifying unit 1400 may include some of the above components. For example, the data classifying unit 1400 may only include the data obtainer 1410 and the classification result provider 1440. According to another embodiment, the data classifying unit 1400 may further include a component in addition to the above components.

The data obtainer 1410 may obtain data required for image classification, and the pre-processor 1420 may pre-process the obtained data such that the obtained data is used for image classification. The pre-processor 1420 may process the obtained data to a pre-set format such that the obtained data is used for image classification.

The classification data selector 1430 may select data required for image classification from the pre-processed data. The selected data may be provided to the classification result provider 1440. The classification data selector 1430 may select some or all of pieces of the pre-processed data based on a pre-set criterion for image classification. Also, the classification data selector 1430 may select data according to a criterion pre-set via learning by the model learner 1340.

The classification result provider 1440 may classify an image by applying the selected data to a data classification model. The classification result provider 1440 may provide a classification result according to a classification purpose of the data. The classification result provider 1440 may apply the selected data to the data classification model using, as an input value, the data selected by the classification data selector 1430. Also, the classification result may be determined by the data classification model.

For example, the classification result provider 1440 may provide a result of classifying a plurality of images into certain groups. Images that are classified into one group may be stored in the same folder.

Also, according to an embodiment, the classification result provider 1440 may estimate an image similar to another image. For example, the classification result provider 1440 may estimate an image having a deep feature similar to that of a first image (for example, one of a pre-stored images or newly input images).

The model updater 1450 may update the data classification model based on evaluation on the classification result provided by the classification result provider 1440. For example, the model updater 1450 may determine whether the data classification model needs to be updated according to the classification result provided by the classification result provider 1440, and when the data classification model needs to be updated, update the data classification model using the model learner 1340. The model learner 1340 may re-train the data classification model by using image data of a user to update the data classification model.

Meanwhile, at least one of the data obtainer 1410, the pre-processor 1420, the classification data selector 1430, the classification result provider 1440, and the model updater 1450 in the data classifying unit 1400 may be manufactured in at least one hardware chip form and included in an electronic apparatus. For example, at least one of the data obtainer 1410, the pre-processor 1420, the classification data selector 1430, the classification result provider 1440, and the model updater 1450 may be manufactured in an AI-exclusive hardware chip or may be manufactured as part of an existing general-purpose processor (for example, CPU or an application processor) or a graphic-exclusive processor (for example, GPU), and included in any electronic apparatus described above.

Also, the data obtainer 1410, the pre-processor 1420, the classification data selector 1430, the classification result provider 1440, and the model updater 1450 may be included in one electronic apparatus or on different electronic apparatuses. For example, some of the data obtainer 1410, the pre-processor 1420, the classification data selector 1430, the classification result provider 1440, and the model updater 1450 may be included in an electronic apparatus, and the remainder may be included in a server.

Also, at least one of the data obtainer 1410, the pre-processor 1420, the classification data selector 1430, the classification result provider 1440, and the model updater 1450 may be implemented in a software module. When at least one of the data obtainer 1410, the pre-processor 1420, the classification data selector 1430, the classification result provider 1440, and the model updater 1450 is implemented in a software module (or a program module including an instruction), the software module may be stored in a non-transitory computer-readable recording medium. The software module may be provided by an OS or a certain application. Alternatively, a part of the software module may be provided by an OS and the remainder of the software module may be provided by a certain application.

Figure 15:
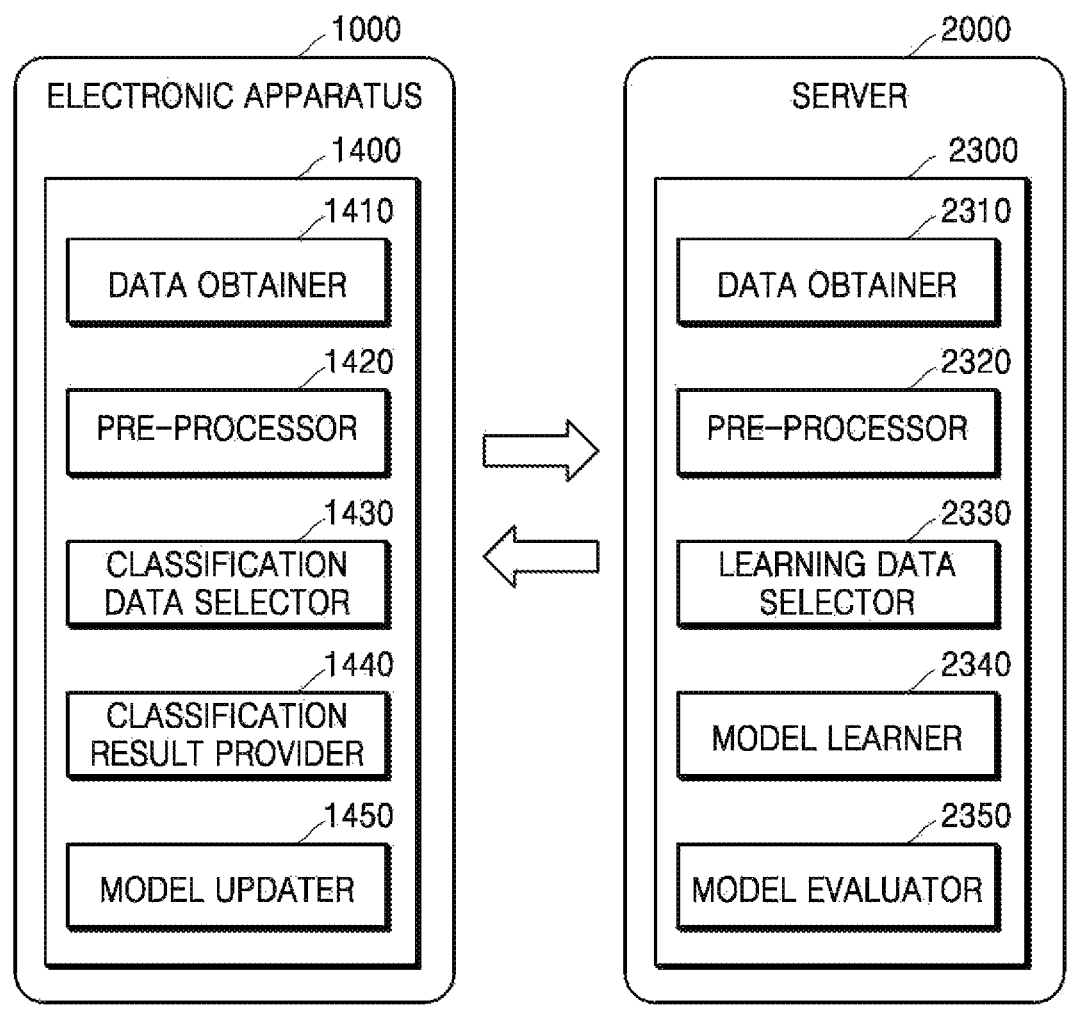
FIG. 15 is a diagram illustrating an example of an electronic apparatus and a server interworking together to learn and recognize data, according to an example embodiment of the present disclosure.

FIG. 15 is a diagram illustrating an example of an electronic apparatus 1000 and a server 2000 interworking together to learn and recognize data, according to an embodiment.

Referring to FIG. 15, the server 2000 may analyze a user image to learn a criterion for classifying an image, and the electronic apparatus 100 may classify a plurality of images based on a learning result by the server 2000. The server 2000 may include a data obtainer (e.g., including processing circuitry and/or program elements) 2310, a pre-processor (e.g., including processing circuitry and/or program elements) 2320, a learning data selector (e.g., including processing circuitry and/or program elements) 2330, a model learner (e.g., including processing circuitry and/or program elements) 2340 and a model evaluator (e.g., including processing circuitry and/or program elements) 2350. These elements are the same as or similar to corresponding elements of the electronic apparatus, and as such detailed descriptions thereof may not be repeated here.

Here, a model learner 2340 of the server 200 may perform a function of the model learner 1340 of FIG. 13. The model learner 2340 may learn a criterion of extracting deep features of a plurality of images, and learn to classify the plurality of images into certain groups based on similarity between the deep features of the plurality of images. The model learner 2340 may obtain data to be used for learning, and apply the obtained data to a data classification model to learn a criterion for classifying the plurality of images.

Also, the classification result provider 1440 of the electronic apparatus 1000 may classify the plurality of images by applying data selected by the classification data selector 1430 to the data classification model generated by the server 2000. For example, the classification result provider 1440 may transmit the data selected by the classification data selector 1430 to the server 2000, and request the server 2000 to classify the plurality of images by applying the data selected by the classification data selector 1430 to the data classification model. Also, the classification result provider 1440 may provide a result of classifying the plurality of images into certain groups. Images classified into one group may be stored in the same folder.

The classification result provider 1440 of the electronic apparatus 1000 may receive a classification model generated by the server 2000 from the server 2000, analyze an image by using the received classification model, and classify the plurality of images. In this case, the classification result provider 1440 of the electronic apparatus 1000 may classify the plurality of images by applying the data selected by the classification data selector 1430 to the classification model received from the server 200. When the electronic apparatus 1000 receives the classification model from the server 2000 to classify the plurality of images, user data security and personal information protection may be reinforced without having to transmit user data (the plurality of user images) to the server 2000.

Figure 16:
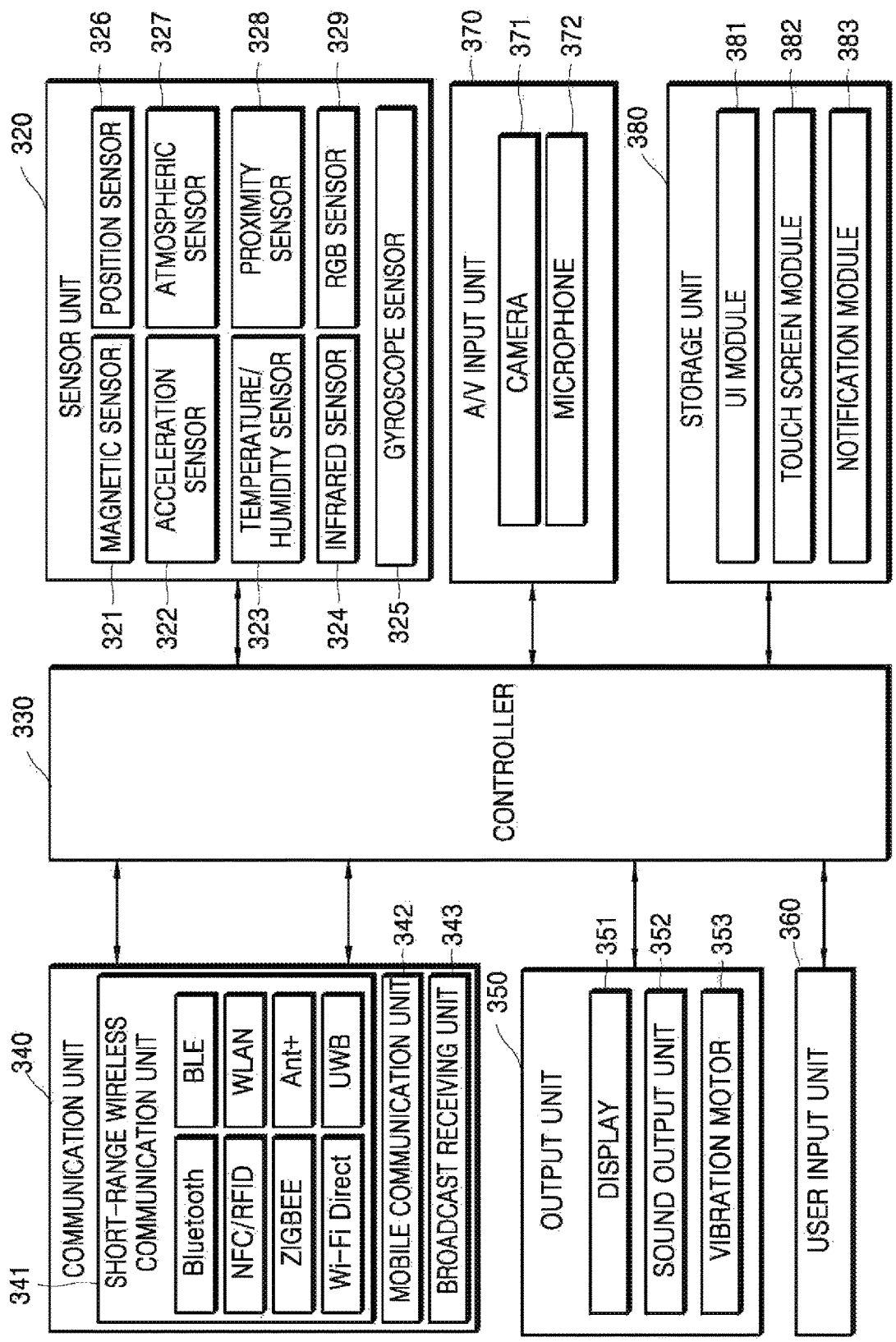
FIG. 16 is a block diagram illustrating an example configuration of an electronic apparatus, according to another example embodiment of the present disclosure.

FIG. 16 is a block diagram illustrating an example configuration of an electronic apparatus 300, according to another example embodiment of the present disclosure. The electronic apparatus 300 of FIG. 16 may be an example of the electronic apparatus 100 of FIG. 1.

Referring to FIG. 16, the electronic apparatus 300 according to an embodiment may include a controller (e.g., including processing circuitry) 330, a sensor unit (e.g., including sensing circuitry) 320, a communication unit (e.g., including communication circuitry) 340, an output unit (e.g., including output circuitry) 350, an input unit (e.g., including input circuitry) 360, an audio/video (AN) input unit (e.g., including A/V input circuitry) 370, and a storage unit 380.

The controller 330 of FIG. 16 may correspond to the processor 120 of FIG. 11, the storage unit 380 of FIG. 16 may correspond to the memory 130 of FIG. 11, and a display 351 of FIG. 16 may correspond to the display 140 of FIG. 11. Accordingly, details of FIG. 16 that are the same as those of FIG. 11 are not repeated here.

The communication unit 340 may include various communication circuitry, including at least one component enabling communication between the electronic apparatus 300 and an external apparatus (for example, a server). For example, the communication unit 340 may include a short-range wireless communication unit 341, a mobile communication unit 342, and a broadcast receiving unit 343.

The short-range wireless communication unit 341 may include various short-range wireless communication circuitry, such as, for example, and without limitation, a Bluetooth communication unit, a Bluetooth Low Energy (BLE) communication unit, a near-field communication (NFC) unit, a wireless local area network (WLAN) (Wi-Fi) communication unit, a Zigbee communication unit, an Infrared Data Association (IrDA) communication unit, a Wi-Fi direct (WFD) communication unit, an ultra-wideband (UWB) communication unit, and an Ant+ communication unit, but is not limited thereto.

The mobile communication unit 342 may include various mobile communication circuitry and transmits and receives a wireless signal to and from at least one of a base station, an external terminal, and a server, on a mobile communication network. Here, the wireless signal may include data having various formats according to transmission and reception of a voice call signal, a video telephone call signal, or a text/multimedia message.

The broadcast receiving unit 343 may include various broadcast receiving circuitry and receives a broadcast signal and/or broadcast related information from an external source, through a broadcast channel. The broadcast channel may include a satellite channel or a terrestrial broadcasting channel. According to an embodiment, the electronic apparatus 300 may not include the broadcast receiving unit 343.

The communication unit 340 may receive at least one image from an external apparatus. Alternatively, the communication unit 340 may request an external server to transmit a feature extraction model and a classification model. The communication unit 340 may transmit a result of classifying a plurality of images to the external server, and receive a feature extraction model and a classification model, which are updated based on the result.

The output unit 350 may include various output circuitry and outputs an audio signal, a video signal, or a vibration signal, and may include the display 351, a sound output unit (e.g., including sound output circuitry) 352, and a vibration motor 353. Since the display 351 has been described above with reference to FIG. 11, details thereof are not provided again.

The sound output unit 352 may include various sound output circuitry and outputs audio data received from the communication unit 340 or stored in the storage unit 380. Also, the sound output unit 352 outputs a sound signal related to a function performed by the electronic apparatus 100. The sound output unit 352 may include, for example, and without limitation, a speaker or a buzzer.

The vibration motor 353 may output a vibration signal. For example, the vibration motor 353 may output a vibration signal corresponding to an output of audio data or video data. Also, the vibration motor 353 may output a vibration signal when a touch screen is touched.

The controller 330 may include various processing circuitry and controls overall operations of the electronic apparatus 300. For example, the controller 330 may execute programs stored in the storage unit 380 to control the communication unit 340, the output unit 350, the user input unit 360, the sensing unit 320, and the AN input unit 370.

The input unit 360 may include various input circuitry used to input data for controlling the electronic apparatus 300. Examples of the user input unit 360 include, for example, and without limitation, one or more of a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The sensor unit 320 may include various sensing circuitry and/or sensors not only a sensor for sensing bio-information of the user, but also for detecting a state of the electronic apparatus 300 or a state around the electronic apparatus 300. Also, the sensor unit 320 may transmit information sensed by the sensor to the controller 330.

The sensing unit 320 may include various sensors and/or sensing circuitry, such as, for example, and without limitation, one or more of a magnetic sensor 321, an acceleration sensor 322, a temperature/humidity sensor 323, an infrared sensor 324, a gyroscope sensor 325, a position sensor 326 (for example, Global Positioning System (GPS)), an atmospheric sensor 327, a proximity sensor 328, and a red-green-blue (RGB) sensor 329 (illuminance sensor), but is not limited thereto. Because functions of each sensor may be intuitively inferred by one of ordinary skill in the art based on its name, details thereof are not described herein.

The A/V input unit 370 may include various AN input circuitry and receives an audio signal or a video signal, and may include, for example, and without limitation, one or more of the camera 371 and a microphone 372. The camera 371 may obtain an image frame of a still image or a moving image via an image sensor in a video telephone mode or a photographing mode. An image captured via the image sensor may be processed by the controller 330 or a separate image processor (not shown).

An image frame processed by the camera 371 may be stored in the storage unit 380 or transmitted to an external device through the communication unit 340. According to an embodiment of the electronic apparatus 300, there may be at least two cameras 371.

The microphone 372 receives an external sound signal and processes the external sound signal to electric voice data. For example, the microphone 372 may receive a sound signal from an external device or a narrator. The microphone 372 may use any one of various noise removing algorithms to remove noise generated while receiving the external sound signal.

The storage unit 380 may store programs for processes and controls of the controller 330, and may store input/output data (for example, applications, content, timeline information of an external device, and address books).

The storage unit 380 may include at least one type of storage medium from among a flash memory, a hard disk, a multimedia card micro-type memory, a card-type memory (for example, a secure digital (SD) card or an extreme digital (XD) card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk. Also, the electronic apparatus 300 may operate web storage or a cloud server performing a storage function of the storage unit 380 on the Internet.

Programs stored in the storage unit 380 may be classified into a plurality of modules based on functions, and may be classified into a user interface (UI) module 381, a touch screen module 382, and a notification module 383.

The UI module 381 may provide a specialized UI or GUI linked to the electronic apparatus 300 according to game applications. The touch screen module 382 may detect a touch gesture of a user on a touch screen, and transmit information about the touch gesture to the controller 330.

The touch screen module 382 may recognize and analyze a touch code. The touch screen module 382 may be configured as separate hardware including a controller.

The notification module 383 may generate a signal for notifying event generation in the electronic apparatus 300. Examples of an event generated by the electronic apparatus 300 include call signal reception, message reception, key signal input, and schedule notification. The notification module 383 may output a notification signal in a video signal format through the display 351, in an audio signal format through the sound output unit 352, or in a vibration signal format through the vibration motor 353.

Meanwhile, the electronic apparaatuses 100 and 300 illustrated in FIGS. 11 and 16 are only examples, and components of the electronic apparatus 100 or 300 may be combined, or an element may be added to or omitted from the electronic apparatus 100 or 300, according to an embodiment. In other words, if required, at least two components may be combined into one component, or one component may be divided into at least two components. Also, functions performed by the components are only examples, and detailed operations do not limit the scope of the present disclosure.

The methods described above may be recorded on a non-transitory computer-readable recording medium by being realized in computer programs executed by using various computers. The non-transitory computer-readable recording medium may include at least one of a program command, a data file, and a data structure. The program commands recorded in the non-transitory computer-readable recording medium may be specially designed or well known to one of ordinary skill in the computer software field. Examples of the non-transitory computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter.

Also, the embodiments may be provided by being included in a computer program product. The computer program product is a product that may be traded between a seller and a purchaser.

The computer program product may include a software program and a computer-readable recording medium having recorded thereon the software program. For example, the computer program product may include a product (for example, a downloadable application) in a form of a software program electronically distributed through an electronic market (for example, Google Play or Appstore) or a manufacturer of a patient monitoring apparatus. For electronic distribution, at least a part of the software program may be stored in a storage medium or may be temporarily generated. In this case, the storage medium may be a storage medium of a server of the manufacturer, a server of the electronic market, or a relay server that temporarily stores the software program.

The computer program product may include a storage medium of a server or a storage medium of an electronic apparatus in a system including the server and the electronic apparatus. Alternatively, when there is a third apparatus (for example, a smart phone) connected to the server or the electronic apparatus, the computer program product may include a storage medium of the third apparatus. Alternatively, the computer program product may include a software program transmitted from the server to the electronic apparatus or to the third apparatus, or from the third apparatus to the electronic apparatus.

In this case, one of the server, the electronic apparatus, and the third apparatus may perform a method according to an embodiment by executing the computer program product. Alternatively, at least two of the server, the electronic apparatus, and the third apparatus may execute the computer program product to distribute and perform a method according to an embodiment.

For example, the server (for example, a cloud server or an AI server) may execute the computer program product stored in the server to control the electronic apparatus connected to the server to perform a method according to an embodiment.

As another example, the third apparatus may execute the computer program product to control the electronic apparatus connected to the third apparatus to perform a method according to an embodiment. When the third apparatus executes the computer program product, the third apparatus may download the computer program product from the server and execute the downloaded computer program product. Alternatively, the third apparatus may execute the computer program product that is pre-loaded to perform a method according to an embodiment.

The electronic apparatus according to an embodiment may classify and search a plurality of images by using a classification criterion optimized for users, by using a feature extraction model and a classification model that are trained based on user data.

During an image search using an electronic apparatus according to an embodiment, a user is able to find a desired image without having to remember all keywords and input a particular keyword, and thus user convenience may be increased.

An electronic apparatus according to an embodiment may automatically assign a keyword suitable for a feature of an image via interworking with a language model, without assignment of a keyword by a user.

While various example embodiments have been described with reference to the figures, it will be understood by those of ordinary skill in the art that various changes in form and details may be made therein without departing from the spirit and scope of the disclosure as set forth in the following claims.

What is claimed is:

1. An electronic apparatus comprising:
a display;
a memory configured to store at least one instruction; and
a processor configured to execute the at least one instruction stored in the memory,
wherein the processor is configured to execute the at least one instruction to cause the electronic apparatus to:
obtain a plurality of images,
extract deep features with respect to the plurality of images using a pre-trained feature extraction model that is based on general-purpose data,
classify the plurality of images into certain groups based on the extracted deep features and a pre-trained classification model that is based on general-purpose data,
display a result of the classification on the display,
determine, based on the result of the classification based on the extracted deep features, whether the feature extraction model and/or the classification model requires updating, and
when it is determined to update at least one of the feature extraction model and the classification model, re-train and update at least one of the feature extraction model and the classification model based on at least data of the user of the electronic device,
wherein the processor is configured to determine whether the feature extraction model and/or the classification model require updating based on a balance of the number of images included in the certain groups.

2. The electronic apparatus of claim 1, wherein the processor is configured to execute the at least one instruction to cause the electronic apparatus to store the plurality of images and the deep features.

3. The electronic apparatus of claim 2, wherein the processor is configured to execute the at least one instruction to cause the electronic apparatus to store the deep features in an exchangeable image file format (EXIF) with respect to the plurality of images.

4. The electronic apparatus of claim 1, wherein the feature extraction model comprises a first neural network, and
the processor is configured to execute the at least one instruction to cause the electronic apparatus to extract a vector from at least one layer of the first neural network by inputting each of the plurality of images to the first neural network,
wherein each of the deep features with respect to the plurality of images comprises the extracted vector.

5. The electronic apparatus of claim 4, wherein the classification model comprises a second neural network configured to classify the plurality of images into the certain groups based on a similarity between the deep features with respect to the plurality of images.

6. The electronic apparatus of claim 5, wherein the similarity between the deep features with respect to the plurality of images comprises a degree of similarity determined by a difference between vectors included in the deep features, wherein the degree of similarity decreases as the difference between the vectors increases, the degree of similarity increases as the difference between the vectors decreases, and a difference between vectors corresponding to images that are classified into one group is within a pre-set range.

7. The electronic apparatus of claim 1, wherein the processor is configured to execute the at least one instruction to cause the electronic apparatus to: obtain a first image, extract a deep feature of the first image, extract at least one image from among the classified plurality of images based on the deep feature of the first image, and display the extracted at least one image on the display.

8. The electronic apparatus of claim 1, wherein the processor is configured to execute the at least one instruction to cause the electronic apparatus to train and update the feature extraction model periodically or based on a received request.

9. The electronic apparatus of claim 1, wherein the processor is configured to execute the at least one instruction to cause the electronic apparatus to, when the classification model is updated, re-classify the classified plurality of images using the extracted deep features and the updated classification model.

10. The electronic apparatus of claim 1, wherein the processor is configured to execute the at least one instruction to cause the electronic apparatus to, when the feature extraction model is updated, re-extract the deep features with respect to the classified plurality of images using the updated feature extraction model, and to re-classify the classified plurality of images using the re-extracted deep features and the classification model.

11. The electronic apparatus of claim 1, wherein, when the feature extraction model is updated, the processor is configured to execute the at least one instruction to cause the electronic apparatus to re-classify, based on deep features with respect to a plurality of images included in a first group from among the certain groups into which the plurality of images are classified, the plurality of images included in the first group into at least two groups.

12. The electronic apparatus of claim 1, wherein, when the feature extraction model is updated, the processor is configured to execute the at least one instruction to cause the electronic apparatus to re-classify a plurality of images included in a first group and a second group from among the certain groups into which the plurality of images are classified, into one group.

13. The electronic apparatus of claim 1, wherein the processor is configured to execute the at least one instruction to cause the electronic apparatus to generate a group name for each of the certain groups.

14. A method of operating an electronic apparatus, the method comprising:
obtaining a plurality of images;
extracting deep features with respect to the plurality of images using a pre-trained feature extraction model that is based on general-purpose data;
classifying the plurality of images into certain groups based on the extracted deep features and a pre-trained classification model that is based on general-purpose data;
displaying a result of the classification;
determining, based on the result of the classification based on the extracted deep features, whether the feature extraction model and/or the classification model needs to be updated; and
when it is determined to update at least one of the feature extraction model and the classification model, re-training and updating at least one of the feature extraction model and the classification model using data of the user of the electronic device,
wherein said determining comprises determining whether the feature extraction model and/or the classification model require updating based on a balance of the number of images included in the certain groups.

15. The method of claim 14, further comprising storing the deep features in an exchangeable image file format (EXIF) with respect to the plurality of images.

16. The method of claim 14, wherein the feature extraction model comprises a first neural network and the classification model comprises a second neural network configured to classify the plurality of images into the certain groups based on a similarity between the deep features with respect to the plurality of images,
wherein the extracting of the deep features with respect to the plurality of images comprises extracting a vector from at least one layer of the first neural network by inputting each of the plurality of images to the first neural network, and
the classifying of the plurality of images into the certain groups comprises classifying at least one image, having a difference between vectors is within a pre-set range, from among the plurality of images into one group.

17. The method of claim 14, further comprising:
obtaining a first image;
extracting a deep feature of the first image;
extracting at least one image from among the classified plurality of images based on the deep feature of the first image; and
displaying the extracted at least one image.

18. The method of claim 14, further comprising, when the classification model is updated, re-classifying the classified plurality of images using the extracted deep features and the updated classification model.

19. The method of claim 14, further comprising:
when the feature extraction model is updated, re-extracting the deep features with respect to the classified plurality of images; and
re-classifying the classified plurality of images using the re-extracted deep features and the classification model.

20. A computer program product comprising a non-transitory computer-readable recording medium having recorded thereon instructions which when executed by a processor cause an electronic apparatus to perform operations to at least:
obtain a plurality of images;
extract deep features with respect to the plurality of images using a pre-trained feature extraction model that is based on general-purpose data;
classify the plurality of images into certain groups based on the extracted deep features and a pre-trained classification model that is based on general-purpose data;
display a result of the classification;
determine whether the feature extraction model and/or the classification model needs to be updated based on a balance of numbers of images classified in certain groups and based on the result of the classification based on the extracted deep features; and
when it is determined to update at least one of the feature extraction model and the classification model, re-train and update at least one of the feature extraction model and the classification model using data of the user of the electronic device based on a result of the determination,
wherein the processor is configured to determine whether the feature extraction model and/or the classification model require updating based on a balance of the number of images included in the certain groups.

* * * * *